(12) United States Patent
Yanai

(10) Patent No.: US 8,482,792 B2
(45) Date of Patent: Jul. 9, 2013

(54) IMAGE FORMING APPARATUS AND CONTROL METHOD THEREOF

(75) Inventor: Tomokazu Yanai, Yokohama (JP)

(73) Assignee: Canon Kabushiki Kaisha (JP)

( * ) Notice: Subject to any disclaimer, the term of this patent is extended or adjusted under 35 U.S.C. 154(b) by 847 days.

(21) Appl. No.: 12/630,297

(22) Filed: Dec. 3, 2009

(65) Prior Publication Data
US 2010/0141972 A1 Jun. 10, 2010

(30) Foreign Application Priority Data

Dec. 5, 2008 (JP) ................................. 2008-311558

(51) Int. Cl.
*H04N 1/60* (2006.01)
*G06F 3/12* (2006.01)

(52) U.S. Cl.
USPC .......... 358/1.9; 358/3.03; 358/3.06; 358/3.26

(58) Field of Classification Search
USPC .............. 358/1.9, 3.01, 3.03, 3.06, 3.26, 530, 358/534
See application file for complete search history.

(56) References Cited

U.S. PATENT DOCUMENTS

| | | | | |
|---|---|---|---|---|
| 5,973,803 | A * | 10/1999 | Cheung et al. | 358/534 |
| 6,363,172 | B1 * | 3/2002 | Cheung et al. | 382/167 |
| 6,543,870 | B1 | 4/2003 | Kakutani | |
| 6,552,822 | B1 * | 4/2003 | Kishimoto | 358/3.03 |
| 6,813,043 | B1 * | 11/2004 | Mizuyama et al. | 358/3.03 |
| 7,315,395 | B2 * | 1/2008 | Yamada et al. | 358/1.9 |
| 7,440,140 | B2 * | 10/2008 | Lee et al. | 358/3.03 |
| 7,701,614 | B2 * | 4/2010 | Yamazaki | 358/3.03 |
| 7,710,603 | B2 * | 5/2010 | Mizutani et al. | 358/3.01 |
| 7,986,440 | B2 | 7/2011 | Yanai et al. | |
| 2003/0112293 | A1 * | 6/2003 | Shimizu et al. | 347/43 |
| 2004/0051905 | A1 * | 3/2004 | Yamada et al. | 358/3.03 |
| 2004/0090654 | A1 * | 5/2004 | Minnebo et al. | 358/3.03 |
| 2005/0237575 | A1 * | 10/2005 | Yamazaki | 358/3.03 |
| 2006/0228035 | A1 * | 10/2006 | Ishikawa | 382/252 |
| 2007/0064272 | A1 * | 3/2007 | Mizutani et al. | 358/3.14 |
| 2007/0268525 | A1 * | 11/2007 | Heydinger et al. | 358/3.06 |

(Continued)

FOREIGN PATENT DOCUMENTS

| | | |
|---|---|---|
| JP | 2001-144959 A | 5/2001 |
| JP | 2008188805 A | 8/2008 |
| JP | 2008193266 A | 8/2008 |

OTHER PUBLICATIONS

Japanese Office Action issued in Japanese counterpart application No. JP2008-311558, dated Sep. 14, 2012.

*Primary Examiner* — Kimberly A Williams
(74) *Attorney, Agent, or Firm* — Rossi, Kimms & McDowell LLP

(57) ABSTRACT

An image forming apparatus having a recording head with a plurality of printing elements comprising: a first quantization unit that performs a first quantization process on input image data to calculate N-level data by using a screen parameter corresponding to a screen condition of a target device; a conversion unit that converts the N-level data to M-level data (M>N); a configuring unit that configures printing density for each of the printing elements for each scan, using the M-level data; a second quantization unit that performs a second quantization process on the printing density for the scan of interest, using constraining information for the scan of interest; and a generating unit that generates the constraining information for the scan of interest, from the printing density configured for the preceding scan and the result of the second quantization process for the preceding scan.

14 Claims, 23 Drawing Sheets

U.S. PATENT DOCUMENTS

2008/0088879 A1* 4/2008 Sugizaki ................. 358/3.06
2008/0186348 A1 8/2008 Yanai et al.
2011/0085207 A1* 4/2011 Ishikawa ................. 358/3.03
2011/0102848 A1* 5/2011 Fan et al. ................. 358/3.06

* cited by examiner

LPF_b
σx(30)=1.0
σy(30)=1.0

2102
| 0.07 | 0.12 | 0.07 |
|---|---|---|
| 0.10 | 0.24 | 0.12 |
| 0.07 | 0.12 | 0.07 |

F_m
σx(40)=0.9
σy(40)=0.9

2104
| 0.07 | 0.12 | 0.07 |
|---|---|---|
| 0.10 | 0.24 | 0.12 |
| 0.07 | 0.12 | 0.07 |

LPF_b
σx(40)=0.9
σy(40)=0.9

Nzzl : NUMBER OF NOZZLES

IMAGE X SIZE : W

Nzzl : NUMBER OF NOZZLES

IMAGE X SIZE : W

IMAGE X SIZE : W

Nzzl : NUMBER OF NOZZLES

IMAGE X SIZE : W

Nzzl : NUMBER OF NOZZLES

FIG. 31

AM SCREEN ●　　　　　　　　　　　　　FM SCREEN ○

AM SCREEN PARAMETERS

|  | C | M | Y | K |
|---|---|---|---|---|
| SCREEN ANGLE [degrees] | 15 | 75 | 0 | 45 |
|  | 105 | −15 | 90 | 135 |
| NUMBER OF SCREEN LINES [lpi] | 175 | 175 | 189 | 175 |

SPOT FUNCTION   Round ○   Euclidean composite ●   Diamond ○

N-VALUES [ 2 ] VALUES

FM SCREEN PARAMETERS

|  | C | M | Y | K |
|---|---|---|---|---|
| HALF-TONE DOT SIZE [μm] | 15 | 75 | 0 | 45 |

N-VALUES [ 2 ] VALUES

[ OK ]   [ Cancel ]

3101 — 3102 — 3103

IMAGE FORMING APPARATUS AND CONTROL METHOD THEREOF

BACKGROUND OF THE INVENTION

1. Field of the Invention

The present invention relates to an image forming apparatus and a control method thereof, and more specifically relates to an image forming apparatus and a control method thereof that performs image formation at lower tones than an input image.

2. Description of the Related Art

Some apparatuses, such as offset printing system, require a plate-making processing. On the other hand, some apparatuses such as inkjet system or electrophotographic system do not require that plate-making processing.

Printing that requires a plate-making process such as offset printing is suitable for printing various data in large quantity, such as printing of magazines or posters. However, it is known that plate-making processing costs much. In order to reduce the cost, before performing main printing, prepress is usually performed with a recording apparatus that does not require a plate-making processing, in order to check the pattern, color tone, document text, and so in an output subject. Consequently, a recording apparatus that does not require a plate-making process based on such as inkjet method or an electrophotographic method, is used as this prepress device.

When, for example, using an inkjet-type or electrophotographic-type recording apparatus as a prepress device, it may be necessary to reproduce an AM/FM screen or half-tone dots, in order to achieve the purpose. However, in an inkjet-type or electrophotographic-type recording apparatus, a decrease in image quality such as density unevenness or worsened granularity easily occurs, due to physical registration shift in main/sub-scanning and due to interference by an AM/FM screen or half-tone dots.

Consequently, a technique to improve the image quality to suppress density unevenness or the like, when attempting to reproduce an AM/FM screen or half-tone dots using the recording apparatus that does not require a prepress process, is proposed (for example, see Japanese Patent Laid-Open No. 2001-144959).

According to this technology, an inkjet-type recording apparatus, which have various inks with different density, is used. Noise data that imitates a screen or half-tone data is added to the image data, in order to determine the dot arrangement for relatively light ink. After the addition of the noise, half-tone processing with an error diffusion method or the like is performed on the image data. Thus, although accurate half-tone dot data is not reproduced, the resulting dot arrangement has high dispersiveness, as well as randomness. As a result, physical registration shift and interference by a screen or half-tone dot pattern can be prevented, and it is possible to reduce density unevenness and worsened granularity. Furthermore, interference can be suppressed by omitting processing to imitate half-tone dots in a high-density region.

However, according to the technique described in above Japanese Patent Laid-Open No. 2001-144959, there are problems as described below.

First, because merely noise data is added that imitates half-tone dots, it is unlikely that accurate half-tone dots are reproduced. Also, because using half-tone dots is avoided in a high-density region, reproducibility of half-tone dots extremely drops.

Further, although high dispersiveness can be obtained in the resulting dot arrangement, appropriate dot arrangements for each of multiple scans is not at all considered when using multi-pass (multi-scan) printing in which an image is formed by performing a plurality of scans. Accordingly, in multi-pass printing, dispersiveness of each scan could be low, and the ratio of dot coverage for a paper face could be changed. Thus, it is not possible to adequately suppress a deterioration of granularity or density unevenness, caused by the registration shift.

SUMMARY OF THE INVENTION

The present invention was made in order to address such problems, and provides an image forming apparatus having functions as stated below and a method controlling that image forming apparatus. That is, the present invention makes it possible to perform image formation with high quality while maintaining half-tone dot reproduction of an input image. Furthermore, particularly when performing multi-pass printing, worsened image quality due to registration shift is suppressed.

According to one aspect of the present invention, the present invention provides an image forming apparatus having a recording head with a plurality of printing elements, wherein the recording head scans the same location on a print medium repeatedly in order to form an image, comprising: a first quantization unit that performs a first quantization process on input image data to calculate N-level data (where N is an integer of at least 2) by using a screen parameter corresponding to a screen condition of a target device; a conversion unit that converts the N-level data to M-level data (M>N); a configuring unit that configures printing density for each of the printing elements for each scan, using the M-level data; a second quantization unit that performs a second quantization process on the printing density for the scan of interest, using constraining information for the scan of interest; and a generating unit that generates the constraining information for the scan of interest, from the printing density configured for the preceding scan and the result of the second quantization process for the preceding scan.

Further features of the present invention will become apparent from the following description of exemplary embodiments (with reference to the attached drawings).

BRIEF DESCRIPTION OF THE DRAWINGS

FIG. 21 shows a specific example of a filter in the constraining information computation of this embodiment.

FIG. 31 shows a user interface in a screen selection unit in this embodiment.

DESCRIPTION OF THE EMBODIMENTS

Following is a detailed description of embodiments of the present invention, with reference to the attached drawings. The configurations disclosed in the below embodiments are only examples, and do not limit the present invention.

Embodiment 1

Figure 1:
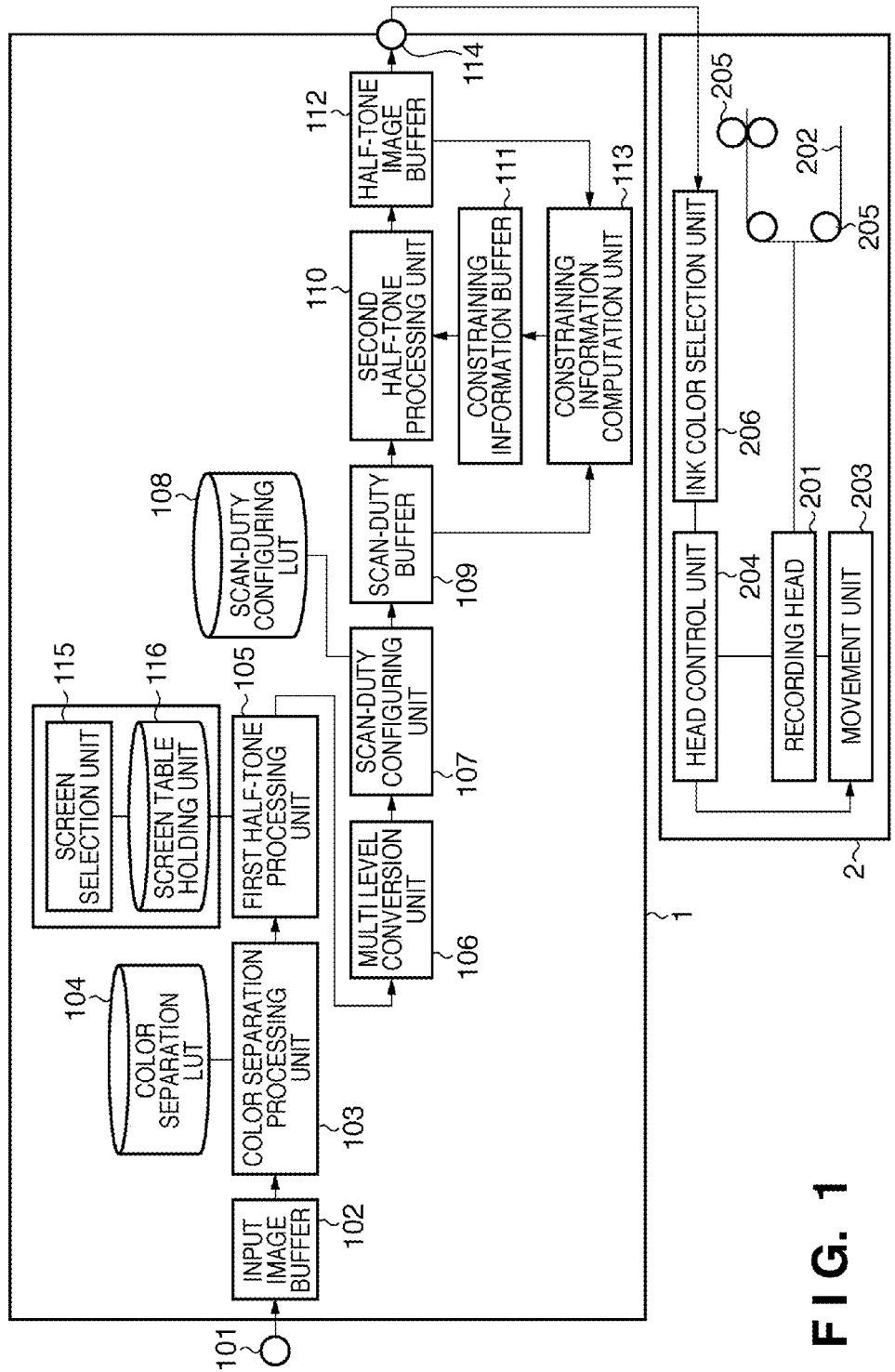
FIG. 1 is a block diagram that shows the configuration of an image forming system in one embodiment according to the present invention.

FIG. 1 is a block diagram that shows the configuration of an image forming system according to the present embodiment. In FIG. 1, reference numeral 1 denotes an image processing apparatus, and reference numeral 2 denotes an inkjet printer. The image processing apparatus 1 can be implemented with a printer driver installed in an ordinary personal computer, for example. In this case, the respective parts of the image forming apparatus 1, which will be described below, are realized by the computer executing a predetermined program. In a different configuration, the inkjet printer 2 may include the image processing apparatus 1.

The image processing apparatus 1 and the inkjet printer 2 are connected by a printer interface or a circuit. The image processing apparatus 1 is input image data to be printed through an image data input terminal 101, and stores this image data in an input image buffer 102.

Referring to a color separation look-up table (LUT) 104, a color separation processing unit 103 performs color separation processing in which the input image data is converted to the ink color data corresponding to the each ink used by the target device. Next, a first half-tone processing unit 105 performs binary conversion processing (first half-tone processing) that converts each ink color data to binary-converted data (0/1) based on selected screen parameters (screen table).

The screen selection unit 115 selects a screen table (specifically, a threshold value matrix) held in the screen table holding unit 116. In the screen selection unit 115, for example, a user interface (UI) shown in FIG. 31 is displayed on a display (not shown) of a personal computer, and the user is allowed to select a screen condition being used in the target device. The user can input or select a desired screen type, with a radio button 3101 in the UI, and desired screen parameters, with a parameter field 3102. In the example in FIG. 31, the user inputs an AM screen with the radio button 3101. The user also inputs a screen angle and a number of screen lines for each color CMYK, and a quantization level N (where N is an integer of at least 2) in the parameter field 3102. The user also selects a spot function with a radio button. In the present embodiment, the device to be a target is an offset printing device, so it is desirable that the user selects the same parameters as the screen parameters used in the offset printing.

When the user inputs and selects the same screen parameters as the target device, and presses an OK button 3103, the screen selection unit 115 selects a screen table corresponding to the screen parameters selected by the user, from the screen table holding unit 116.

The first half-tone processing unit 105 performs half-tone processing using the screen table selected by the screen selection unit 115.

A multi level conversion unit 106 performs multi level conversion processing on the binary-converted data to generate D_m multi level data. Here, D_m is $0 < D\_m \leq 255$ in the case of 8-bit data, and D_m is $0 < D\_m \leq 65535$ in the case of 16-bit data. The multi level conversion unit 106 can apply gain to the binary-converted data. Alternatively, the multi level conversion unit 106 can apply low pass filters to the binary-converted data.

Also, although omitted from the present embodiment, processing may be performed that further converts CMYK data (D_m multi level data) to C'M'Y'K' data, in order to match the color of offset printing to the color of the inkjet printer. In this case, color matching will be more precise by applying a low-pass filter on the binary-converted data to give D_m multi level data, and then converting the D_m multi level data into the C'M'Y'K' data, than by simply applying gain to the binary-converted data.

Also, when six ink colors CMYKLc(light cyan)Lm(light magenta), are provided in the inkjet printer, processing may be performed to convert from CMYK data to C'M'Y'K'Lc'Lm' data. At this time, a conversion table that converts from four color data to six color data may be used. Because one of the main concerns of the present embodiment is matching of the half-tone dots between the target device and the inkjet printer, a description of the above color matching is omitted here.

A scan-duty configuring unit 107, converts D_m multi level data, which may be C'M'Y'K' data or C'M'Y'K'Lc'Lm' data, into ink color data for each nozzle for each scan, based on a scan duty configuring LUT 108, and then stores that data in a scan-duty buffer 109. Here the scan-duty data that is configured indicates a printing amount of ink for each nozzle in each scan, and accordingly the scan-duty configuring unit 107 calculates a printing amount for each scan.

A second half-tone processing unit 110 converts the multi level data of each color for each scan, obtained by the scan-duty configuring unit 107, into binary image data, based on data accumulated in a constraining information buffer 111 described below (second half-tone processing). The binary image data will be used for forming an image in the inkjet printer 2.

The constraining information buffer 111 has accumulated information that indicates the likelihood that a dot will be formed at each position in a recorded image. The constraining information buffers 111 are is provided for each color. Binary image data of each color obtained in a second half-tone processing unit 110 is stored in a half-tone image buffer 112. The binary image data stored in the half-tone image buffer 112 is output to the inkjet printer 2 from an output terminal 114.

A constraining information computation unit 113 creates constraining information by performing predetermined computation, based on both the binary image data stored in the half-tone image buffer 112 and duty data of each scan stored in the scan-duty buffer 109, and then updates the contents of the constraining information buffer 111.

The inkjet printer 2 forms an image on a print medium using the binary image data from the image processing apparatus 1, by moving a recording head 201 vertically/horizontally relative to a print medium 202. It is possible to use a thermal transfer-type recording head, an electrophotographic-type recording head, an inkjet-type recording head, or the like, as the recording head 201. And any of these has at least one printing element (nozzle, in the case of an inkjet-type recording head). A movement unit 203, controlled by the head control unit 204, moves the recording head 201. A conveyance unit 205, controlled by the head control unit 204, conveys the print medium. Also, an ink color selection unit 206 selects one of an ink color which is used in the recording head 201, based on the binary image data of each color formed by the image processing apparatus 1.

Figure 2:
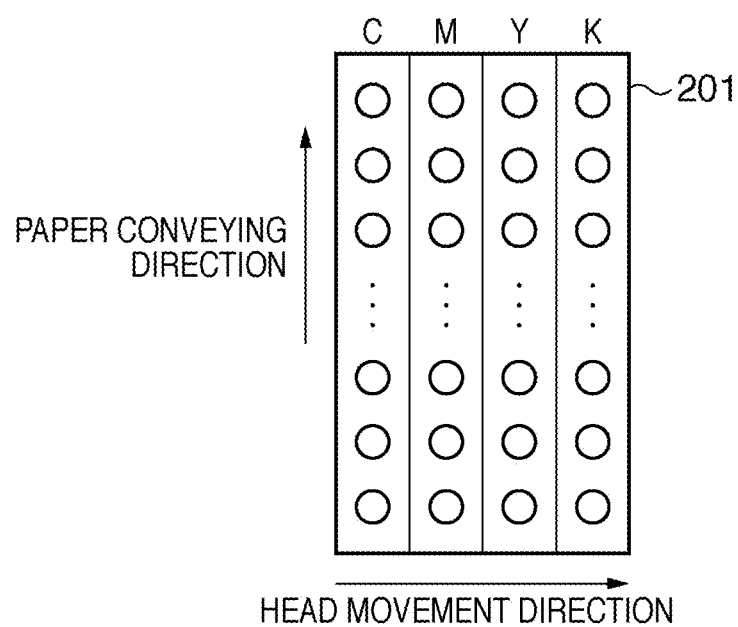
FIG. 2 shows an example configuration of a recording head in a printer of this embodiment.

FIG. 2 shows an example configuration of the recording head 201. In the present embodiment, ink of four colors cyan (C), magenta (M), yellow (Y), and black (K) is installed in the recording head 201. The recording head may also have additional colors besides these four colors, for example, light cyan (Lc) and light magenta (Lm), which have a relatively lower ink density.

Note that in order to simplify the description, FIG. 2 shows a configuration in which nozzles are arranged in a row in a direction the paper is conveyed. However, both the number and arrangement of nozzles are not limited by this example. For example, the recording head 201 may have rows comprising nozzles of the same color but different discharge amounts, or may have a plurality of rows of nozzles with the same discharge amount, or may have a configuration in which nozzles are in a zigzag arrangement. Also, in FIG. 2, nozzles of each color are arrayed along the head movement direction. However, nozzles of each color may be arrayed along the paper conveyance direction.

Next, image forming processing in the image processing apparatus 1 of the embodiment, comprising the above described functional configuration, is described with reference to the flowchart in FIG. 3.

First, input image data, which is multi level color data, is input from the input terminal 101, and stored in the input image buffer 102 (S101). The input image data are constructed from three color components: red (R), green (G), and blue (B).

Next, color separation processing from RGB to a CMYK ink color plane is performed on the input image data stored in the input image buffer 102, in the color separation processing unit 103, using the color separation LUT 104 (S102). In the present embodiment, data of each pixel after color separation processing is handled as 8-bit data, but conversion to a greater number of levels may also be performed.

The recording head 201 in the present embodiment as described above possesses four ink colors. Therefore, RGB input image data is converted to CMYK image data having a total of four planes, with one plane for each of CMYK. That is, image data for four planes corresponding to the four ink colors is generated.

Figure 4:
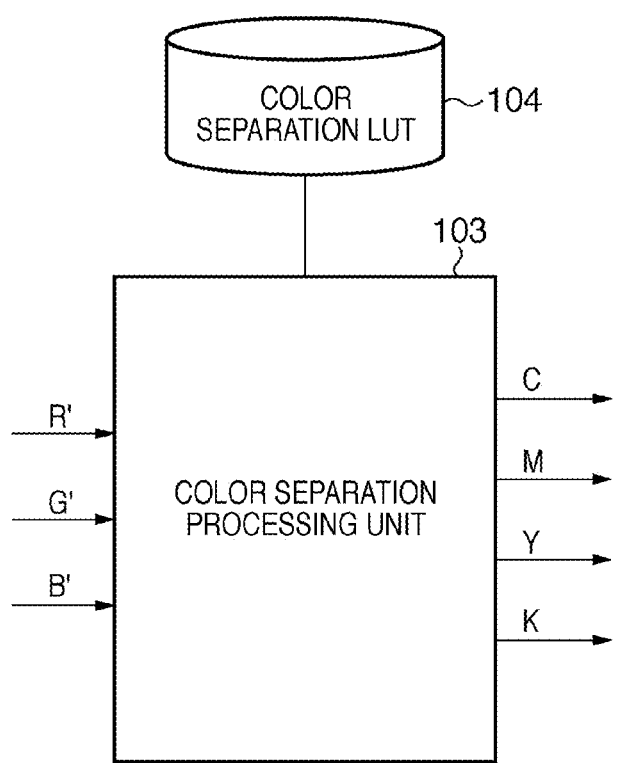
FIG. 4 shows details of input-output data in a color separation processing unit of this embodiment.

Following is a description of details of color separation processing in the present embodiment, with reference to FIG. 4.

FIG. 4 shows details of input and output data at the color separation processing unit 103. As shown in FIG. 4, R'G'B' input image data is converted to CMYK data with reference to the color separation LUT 104, as shown in the following formulas.

$$C=C\_LUT\_3D(R',G',B') \quad (1)$$

$$M=M\_LUT\_3D(R',G',B') \quad (2)$$

$$Y=Y\_LUT\_3D(R',G',B') \quad (3)$$

$$K=K\_LUT\_3D(R',G',B') \quad (4)$$

Here, the respective functions defined on the right side of formulas (1) to (4) correspond to contents of the color separation LUT 104. In the color separation LUT 104, an output data for each ink color is determined from the three input data red, green, and blue. In the present embodiment, the target device is provided with the four colors CMYK, so the LUT is configured so as to obtain four output data from three input data.

By the above processing, color separation processing in the present embodiment is completed.

Figure 5:
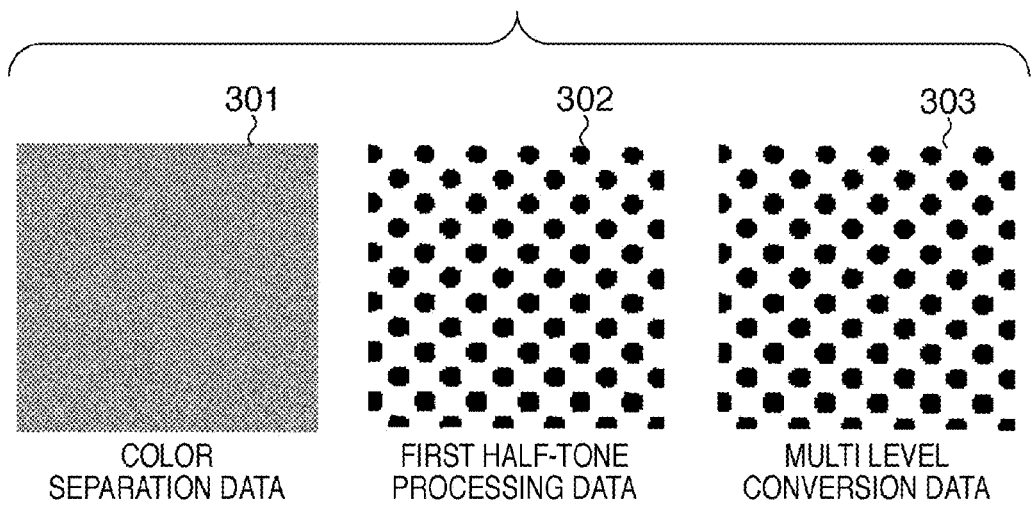
FIG. 5 shows an example of output data from color separation processing, first half-tone processing, and multi level conversion processing in this embodiment.

Returning to FIG. 3, next, the first half-tone processing unit 105 performs binary conversion (first half-tone processing) on the color-separated data (S103). In the present embodiment, the screen table corresponding to the screen parameters determined by the screen selection unit 115 is acquired from the screen table holding unit 116, as an example. Then, binary conversion is performed using the selected screen table. However, this is not limited to binary conversion. Binary conversion or multi level conversion by an error diffusion method or the like may also be performed. Here, reference numeral 301 in FIG. 5 indicates color-separated data that is input to the first half-tone processing unit 105. Reference numeral 302 indicates binary-converted data that is output from the first half-tone processing unit 105. Where threshold value matrices that determine the dot arrangement of the AM screen of each of CMYK are respectively Th_C_AM, Th_M_AM, Th_Y_AM, and Th_K_AM, the processing in the first half-tone processing unit 105 can be expressed by below formulas (5) to (12).

$$\text{When } C \leq Th\_C\_AM, C\_b=0 \quad (5)$$

$$\text{When } Th\_C\_AM \leq C, C\_b=1 \quad (6)$$

$$\text{When } M \leq Th\_M\_AM, M\_b=0 \quad (7)$$

$$\text{When } Th\_M\_AM \leq M, M\_b=1 \quad (8)$$

When $Y \leq Th\_Y\_AM, Y\_b=0$ (9)

When $Th\_Y\_AM \leq Y, Y\_b=1$ (10)

When $K \leq Th\_K\_AM, K\_b=0$ (11)

When $Th\_K\_AM \leq K, K\_b=1$ (12)

Next, the multi level conversion unit 106 performs multi level conversion on data of four planes, C_b, M_b, Y_b, and K_b, that have been binary-converted in the first half-tone processing unit 105. This conversion is performed as indicated by below formulas (13) to (16). Thus, multi level data C_m, M_m, Y_m, and K_m are output (S104). Reference numeral 303 in FIG. 5 indicates multi level data that is output from the multi level conversion unit 106. Here, D_m indicates a highest level after multi level conversion as described above.

$C\_m = C\_b \times D\_m$ (13)

$M\_m = M\_b \times D\_m$ (14)

$Y\_m = Y\_b \times D\_m$ (15)

$K\_m = K\_b \times D\_m$ (16)

Note that in the above example, multi level conversion is performed on binary data by applying simple gain of D_m, but conversion to a D_m data may also be performed by applying a low pass filter to binary data.

Also, after the above processing, in order to match color of the target device with color of the inkjet printer, the CMYK multi level data that has been converted in the multi level conversion unit 106 may be further converted into C'M'Y'K' multi level data. In this case, color matching will be more precise when performing multi level conversion by applying a low pass filter to the binary data, than performing multi level conversion to D_m data by simply applying gain to the binary-converted data.

Also, when six ink colors CMYKLc(light cyan)Lm(light magenta), are provided by the inkjet printer, processing may be performed to convert from CMYK multi level data to multi level data of six colors C'M'Y'K'Lc'Lm'.

Next, the scan-duty configuring unit 107 configures a scan number k and a Ycut(k) that indicates a Y coordinate of a clipping position of multi-level converted data (S105). Ycut (k) indicates a position where multi-level converted data for the scan number k is clipped, and corresponds to the coordinates of an upper end of the nozzle. The initial value of the scan number k is 1, and is incremented by 1 for each processing loop.

Here, a technique of configuring Ycut, which is the Y-coordinate of the clipping position of the multi-level converted data, is described, referring to the 4-pass printing with a row of 16 nozzles as an example, wherein an image is formed with 4 scans on the same area in a print medium.

Figure 6:
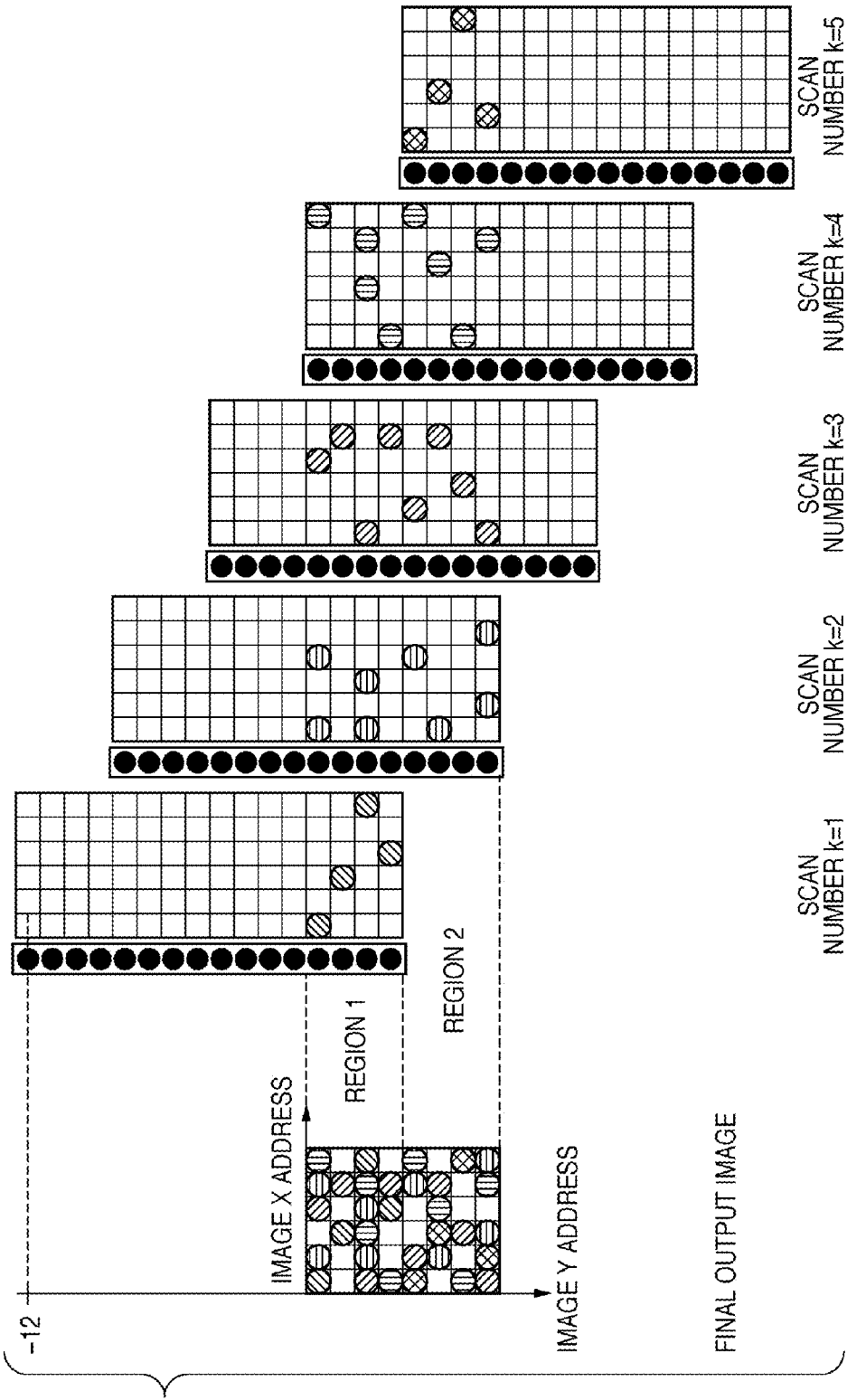
FIG. 6 shows an overview of image forming with 16 nozzles and 4 pass printing in this embodiment.

Ordinarily, in the case of 4-pass printing, as shown in FIG. 6, at the initial value (k=1) of the scan number, image forming is performed using only one-fourth of nozzles at the lower end. At scan number k=2, image forming is performed after feeding paper by ¼ of the length of the nozzle relative to when the scan number k=1. When the scan number k=3, image forming is performed after feeding paper by ¼ of the length of the nozzles relative to when the scan number k=2. The output image is formed by repeating such image forming and paper feeding. Therefore, when the scan number k=1, the clipping position Ycut of the multi-level converted data corresponds to the coordinate of the upper end of the nozzle, and Ycut=−12.

In general, the above clipping position Ycut(k) of the multi-level converted data can be given in the following formula, where Nzzl is the number of nozzle rows, Pass is the number of passes, and k is the scan number.

$Ycut(k) = -Nzzl + (Nzzl/Pass) \times k$ (17)

After Ycut(k) is configured as described above, the scan-duty configuring unit 107 configures a duty value for each scan, based on a scan-duty configuring LUT 108 and image data of the multi-level converted planes (S106).

Figure 7:
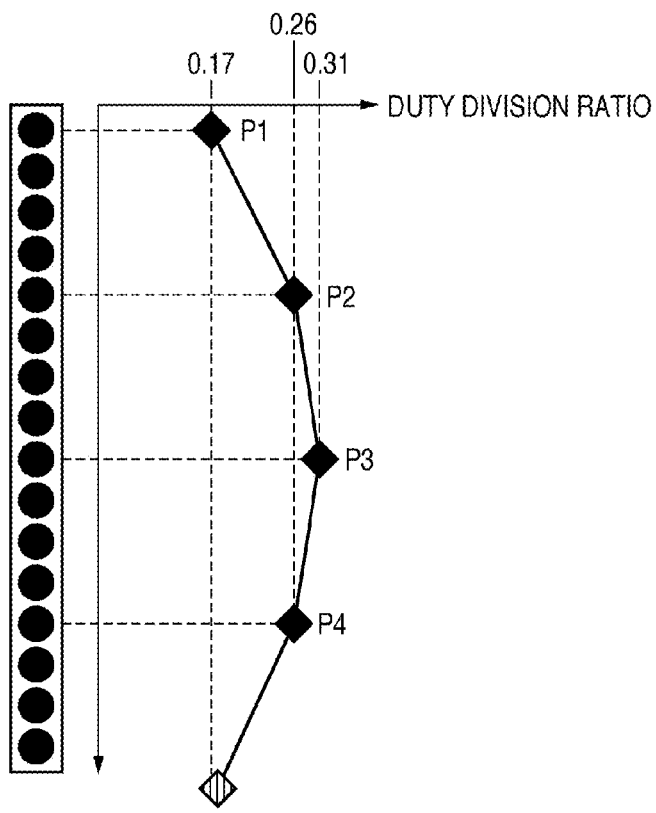
FIG. 7 shows an example of a duty division ratio held in a scan-duty configuring LUT in this embodiment.

According to the scan-duty configuring LUT 108, in the case of 4-pass printing, values as shown in FIG. 7 are given. FIG. 7 shows an example with 16 nozzles and four passes, where the vertical axis shows the nozzle positions and the horizontal axis shows duty division ratio. According to FIG. 7, inflection points P1 to P4 are configured for each four nozzles. Duty division ratios of the 16 nozzles are given by linearly interpolating the inflection points, and the duty division ratios are held as the scan-duty configuring LUT 108. Here, the numerical values of P1 to P4 are configured as described below.

$P1 + P2 + P3 + P4 = 1.0$ (18)

As for the values held in the scan-duty configuring LUT 108, the above configuring technique is not intended to limit the invention; for example, inflection points may be more finely configured, or may be directly designated for each nozzle.

Figure 8:
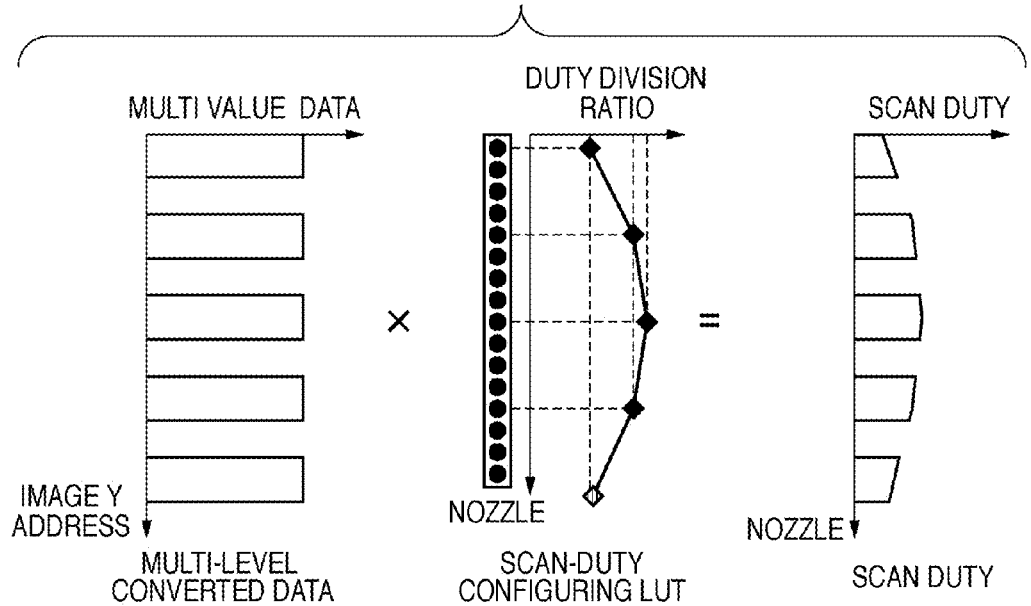
FIG. 8 shows an overview of a scan-duty configuring method in this embodiment.

The scan-duty configured in Step S106, as shown in FIG. 8, is configured as the product of the scan-duty configuring LUT 108 and the multi-level converted data. That is, as shown on the left side in FIG. 8, by multiplying the duty division ratio configured for each nozzle by the multi-level converted data after the first half-tone processing, the scan-duty of each nozzle can be configured as shown on the right side in FIG. 8. Thus, when scanning is performed to actually form an image of the target multi-level converted data, each nozzle discharges only the amount of ink indicated by the scan-duty.

Figure 9:
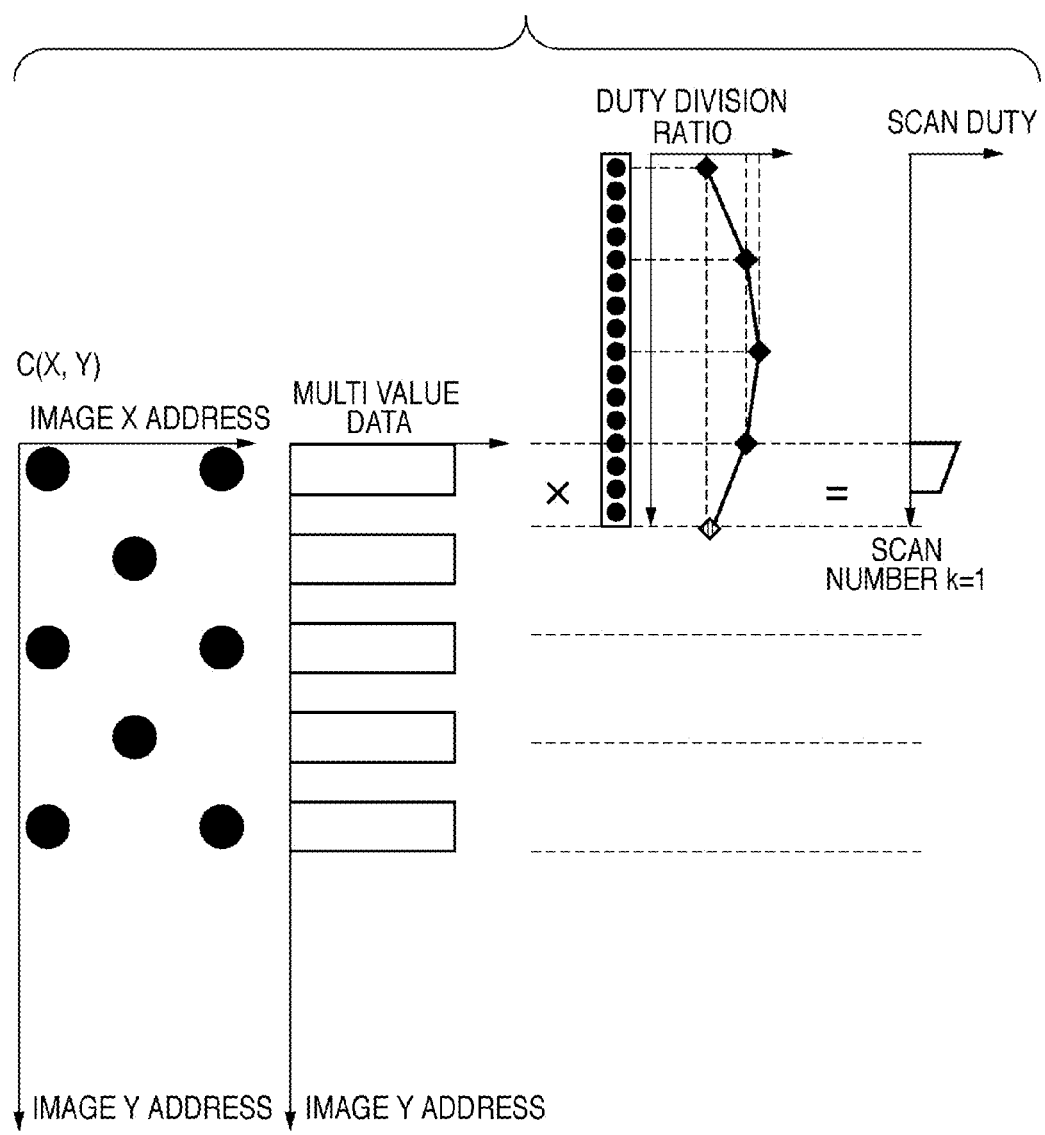
FIG. 9 shows an overview of the scan-duty configuring method in this embodiment.

Here, in the present embodiment, when the corresponding nozzle is at a coordinate outside of the Y address of an image region, the scan-duty is made 0. For example, when the scan number k=1, as shown in FIG. 9, in three-fourths of nozzles from the upper end, Y address of the image is negative and thus scan-duty value is made 0. According to a one-fourths of nozzles at the lower end, significant values are substituted for the scan-duty value.

Figure 10:
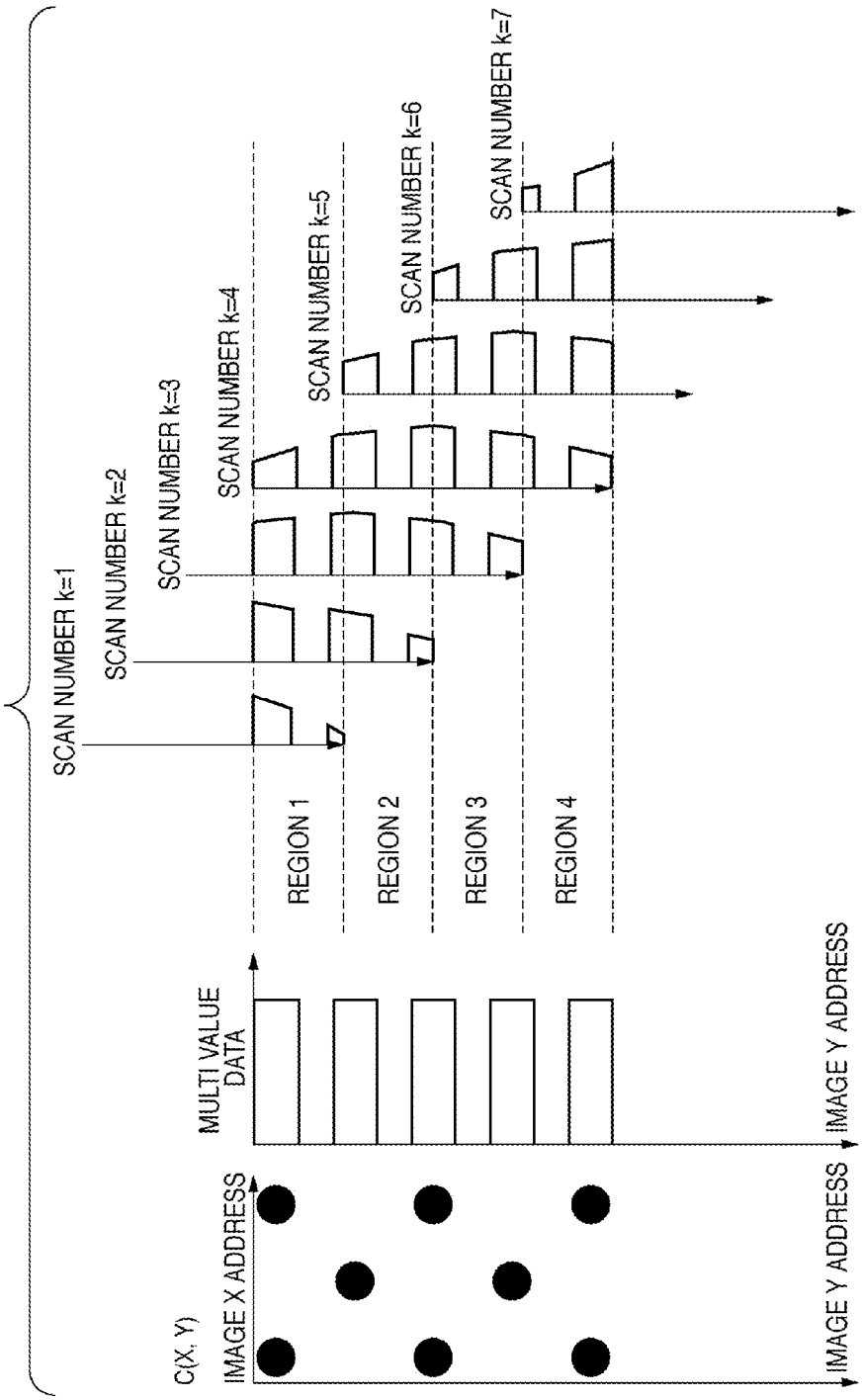
FIG. 10 shows an overview of the scan-duty configuring method in this embodiment.

Also, because the clipping position Ycut(k) of the multi-level converted data is determined from the scan number k, when the scan number k=1 to 7, the scan-duty is determined as shown in FIG. 10. In FIG. 10, scan-duty is shown for each of the nozzle position of each scan number. Referring to FIG. 10, it can be understood that the scan-duty differs for each scan number. Each scan-duty in FIG. 10 is determined from the product of multi-level converted data and the scan-duty configuring LUT 108. The product of multi-level converted data and the LUT is obtained while feeding paper. Accordingly, the total scan duty for four scans (scan number k=1 to 4) is the same as the multi-level converted data in the region 1. Likewise in regions 2, 3, and 4, the total scan duty is the same as the multi-level converted data.

In the present embodiment, as shown in FIG. 10, the scan-duty is separated for each scans. Here, a duty separation threshold D_Th3 is prepared in advance and compared to the multi-level converted data. When the multi-level converted data is less than D_Th3 (corresponding to formulas (19) to (25) described below), image forming is performed through one, two, or three scans, rather than four scans.

The scan-duty configuration process in the scan-duty configuring unit 107 as described above will be shown in detail as formulas below. In the formula below, only cyan C_m(X,Y) data is shown as an example. C_d(X,Y) indicates the scan-duty at an address (X,Y), and S_LUT(Y) indicates the value of the scan-duty configuring LUT 108 at the address Y. Also, $0 \leq nx <$ image X size, and $0 \leq ny < Nzzl$ (Nzzl is the number of nozzle rows, in this case Nzzl is 16). As duty separation threshold values, D_Th2 and D_Th1 (D_Th3>D_Th2>D_Th1) that indicate smaller threshold values are defined in addition to the above D_Th3.

When C_m(nx, Ycut(k)+ny)≧D_Th3,
C_d(nx, ny)=C_m(nx, $$Ycut(k)+ny) \times s\_LUT(ny) \quad (19)$$

When C_m(nx, Ycut(k)+ny)≦D_Th1,
for "scan number k=1, 5, . . . , 4n+1 (where n is an integer of at least 0)", $$C\_d(nx,ny)=C\_m(nx,Ycut(k)+ny) \quad (20)$$

For "scan number other than above", $$C\_d(nx,ny)=0 \quad (21)$$

When C_m(nx, Ycut(k)+ny)≦D_Th2,
for "scan number k=1, 5, . . . , 4n+1" and
for "scan number k=2, 6, . . . , 4n+2", $$C\_d(nx,ny)=C\_m(nx,Ycut(k)+ny)/2 \quad (22)$$

For "scan number other than above", $$C\_d(nx,ny)=0 \quad (23)$$

When C_m(nx, Ycut(k)+ny)≦D_Th3,
for "scan number k=1, 5, . . . , 4n+1", and
for "scan number k=2, 6, . . . , 4n+2", and
for "scan number k=3, 7, . . . , 4n+3", $$C\_d(nx,ny)=C\_m(nx,Ycut(k)+ny)/3 \quad (24)$$

For "scan number other than above", $$C\_d(nx,ny)=0 \quad (25)$$

Above formula (19) indicates ordinary duty separation processing, and formulas (20) to (25) indicate exceptional duty separation processing. When the multi-level converted data is smaller than D_Th1, image forming is performed with one scan as indicated in formulas (20) and (21), and when the multi-level converted data is smaller than D_Th2, image forming is performed with two scans as indicated in formulas (22) and (23). When the multi-level converted data is smaller than D_Th3, image forming is performed with three scans as indicated in formulas (24) and (25).

Scan-duty separation is likewise performed for M_m(X, Y), Y_m(X, Y), and K_m(X, Y) according to the above formulas.

In the present embodiment, an example of 4-pass printing is described, so exceptional duty separation processing as in formulas (20) to (25) is performed. However, in the case of 8-pass printing for example, it is likewise necessary to configure duty separation threshold values D_Th1 to D_Th7 and perform exceptional duty separation processing.

Figure 11:
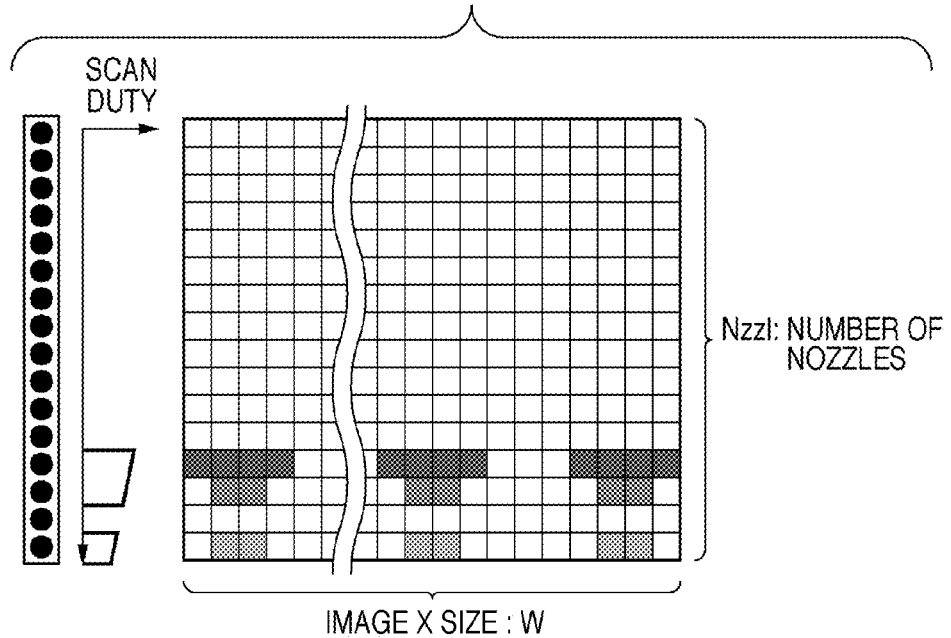
FIG. 11 shows an example of the band configuration of a scan-duty buffer in this embodiment.

Scan-duty data that has been configured by the scan-duty configuring unit 107 as described above is stored in the scan-duty buffer 109 (S107). That is, as shown in FIG. 11, the scan-duty buffer 109 stores, for each color, scan-duty data in a band-like form in which the vertical direction corresponds to the number of nozzles and the horizontal direction corresponds to the X size of the image.

Next, in the second half-tone processing unit 110, the total value of the scan-duty data stored in the scan-duty buffer 109 and the constraining information data stored in the constraining information buffer 111 is converted to two-level tone data (binary data) (S108). That is, second half-tone processing is performed.

Figure 12:
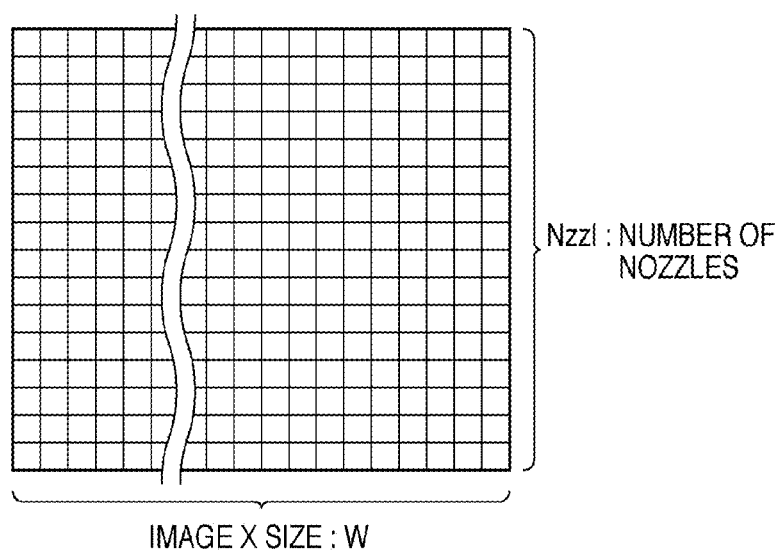
FIG. 12 shows an example of the band configuration of a constraining information buffer in this embodiment.

As shown in FIG. 12, the constraining information buffer 111 also stores, for each color, constraining information data in a band-like form in which the vertical direction corresponds to the number of nozzles and the horizontal direction corresponds to the X size of the image. In the constraining information buffer 111, constraining information that indicates the likelihood that a dot will be formed at each position in a recorded image is stored, and updated for each scan number k. When starting processing for scan number k=1, 0 is substituted for the constraining information data as the common initial value. That is, where the constraining information of each color at an address (x, y) is C_r(x, y), M_r(x, y), Y_r(x, y), and K_r(x, y), these constraining information are shown below when the scan number k=1. Note that $0 \leq nx <$ image X size, and $0 \leq ny < Nzzl$ (Nzzl is the number of nozzle rows: in this case Nzzl is 16).

$$C\_r=(nx,ny)=0 \quad (26)$$

$$M\_r=(nx,ny)=0 \quad (27)$$

$$Y\_r=(nx,ny)=0 \quad (28)$$

$$K\_r=(nx,ny)=0 \quad (29)$$

Therefore, the constraining information, which is stored in the constraining information buffer 111, will be updated to significant constraining information when the scan number k≧2. Dot formation is less likely at the location with smaller constraining information values, and conversely, dot formation is more likely at the location with larger constraining information values. The average of the values stored in the constraining information buffer 111 is 0 regardless of the scan number. Specifically, when dot formation at that location is likely, a positive value is stored, and when dot formation at that location is unlikely, a negative value is stored. Details of updating the constraining information will be described later.

Figure 13:
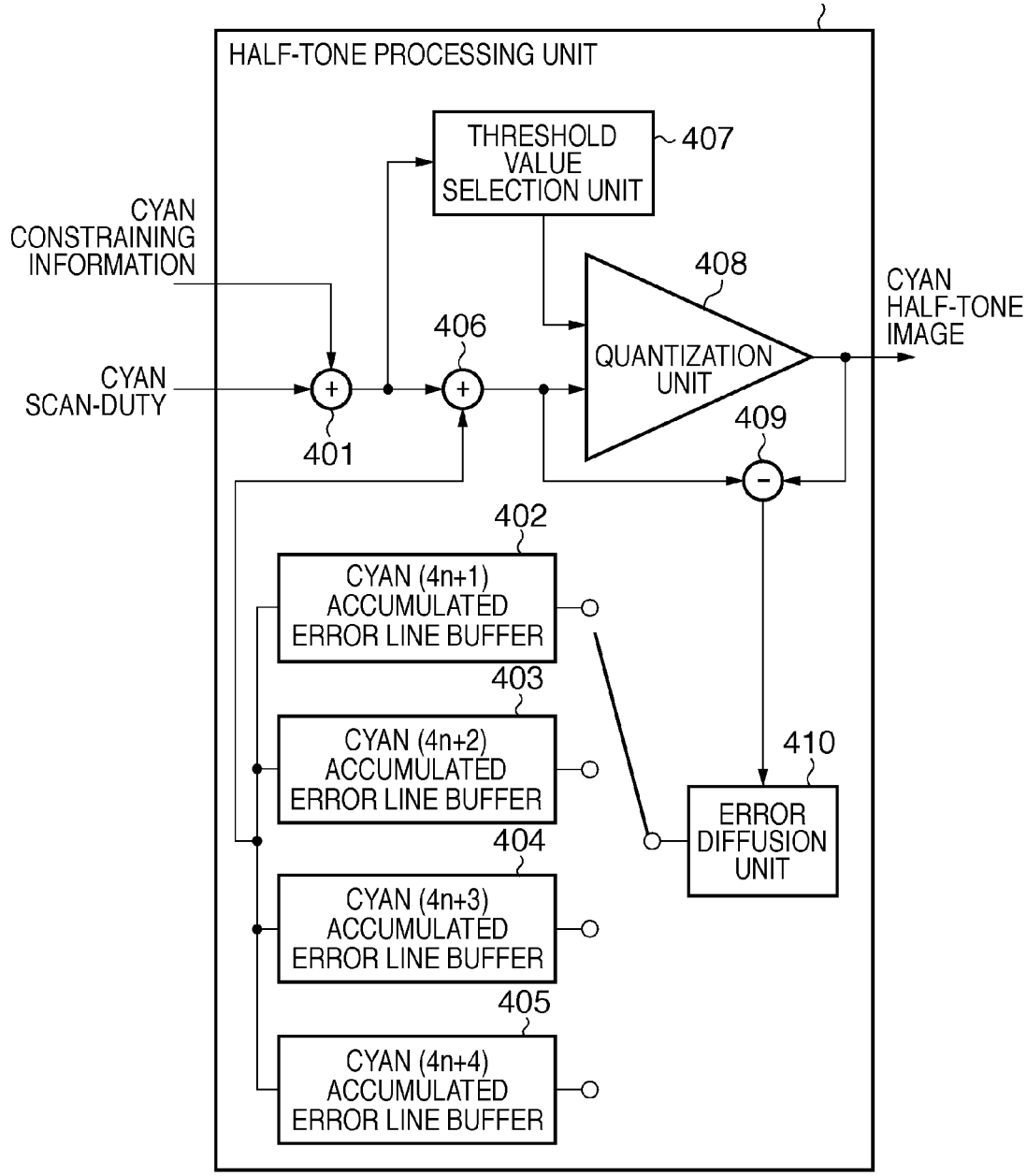
FIG. 13 is a block diagram that shows the detailed configuration of a second half-tone processing unit in this embodiment.

In the second half-tone processing of the present embodiment, a widely known error diffusion method is used for example as processing that converts scan-duty data to a binary image (or an image with two or more levels, and having fewer tones than the input number of tones). Below, the half-tone processing of the present embodiment is described in detail with reference to a block diagram in FIG. 13 and a flowchart in FIG. 14, and in order to simplify the description, half-tone processing of cyan for 4-pass printing when the scan number k=1 is described as an example. FIG. 13 is a block diagram that shows the detailed configuration of a second half-tone processing unit 110, and FIG. 14 is a flowchart that shows details of half-tone processing in the second half-tone processing unit 110.

Figure 14:
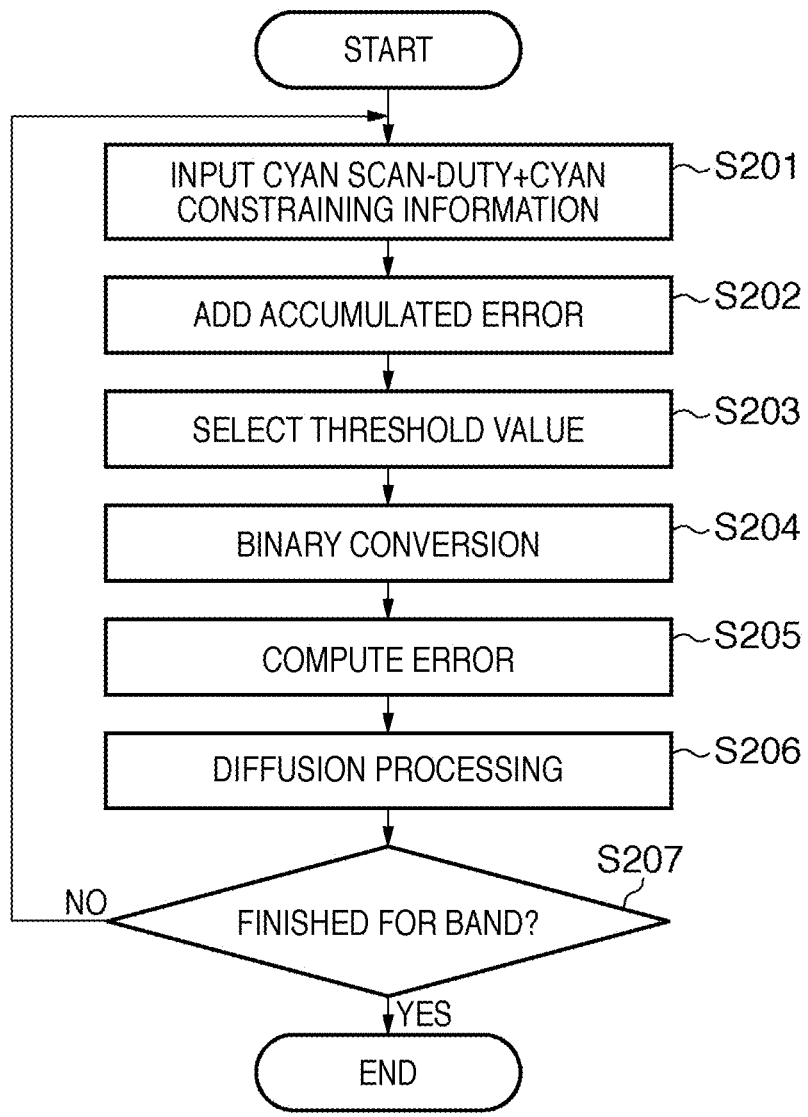
FIG. 14 is a flowchart that shows second half-tone processing in this embodiment.

First, in Step S201 shown in FIG. 14, a total of the scan-duty and constraining information for cyan is input. That is, in a constraining information adding unit 401 shown in FIG. 13, a total value data Ic of the cyan scan-duty C_d and constraining information C_r is calculated as described below. However, all values of the constraining information C_r are 0 when the scan number k=1.

$$Ic=C\_d+C\_r \quad (30)$$

Next, in Step S202, accumulated errors are added for error diffusion processing. Below, accumulated error adding processing will be described in detail.

Figure 15:
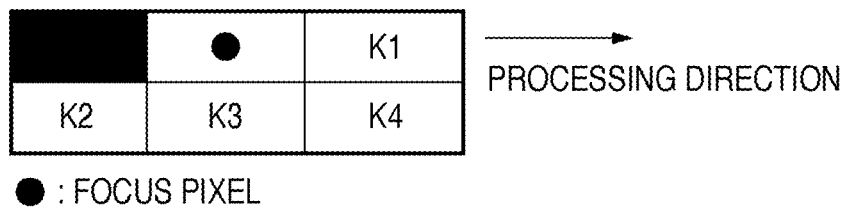
FIG. 15 shows an example of error diffusion coefficients in this embodiment.

In the present embodiment, as error diffusion coefficients for error diffusion processing, there are four coefficients K1 to K4 as shown in FIG. 15. For example, K1=7/16, K2=3/16, K3=5/16, and K4=1/16. However, the diffusion coefficients do not have to be fixed values; they may be variable according to tone (for example, according to C_d). In addition, there may be more than the four coefficients described above.

In order to diffuse and accumulate errors using such error diffusion coefficients, in the second half-tone processing unit 110, four groups of line buffers for accumulated errors are provided for cyan (402 to 405), and the line buffer is switched for each scan number as described below, for example.

"When scan number k=1, 5, . . . , 4n+1 (where n is an integer of at least 0)",
use cyan (4n+1) line buffer 402.
"When scan number k=2, 6, . . . , 4n+2",
use cyan (4n+2) line buffer 403.
"When scan number k=3, 7, . . . , 4n+3",
use cyan (4n+3) line buffer 404.
"When scan number k=4, 8, . . . , 4n+4",
use cyan (4n+4) line buffer 405.

Figure 16:
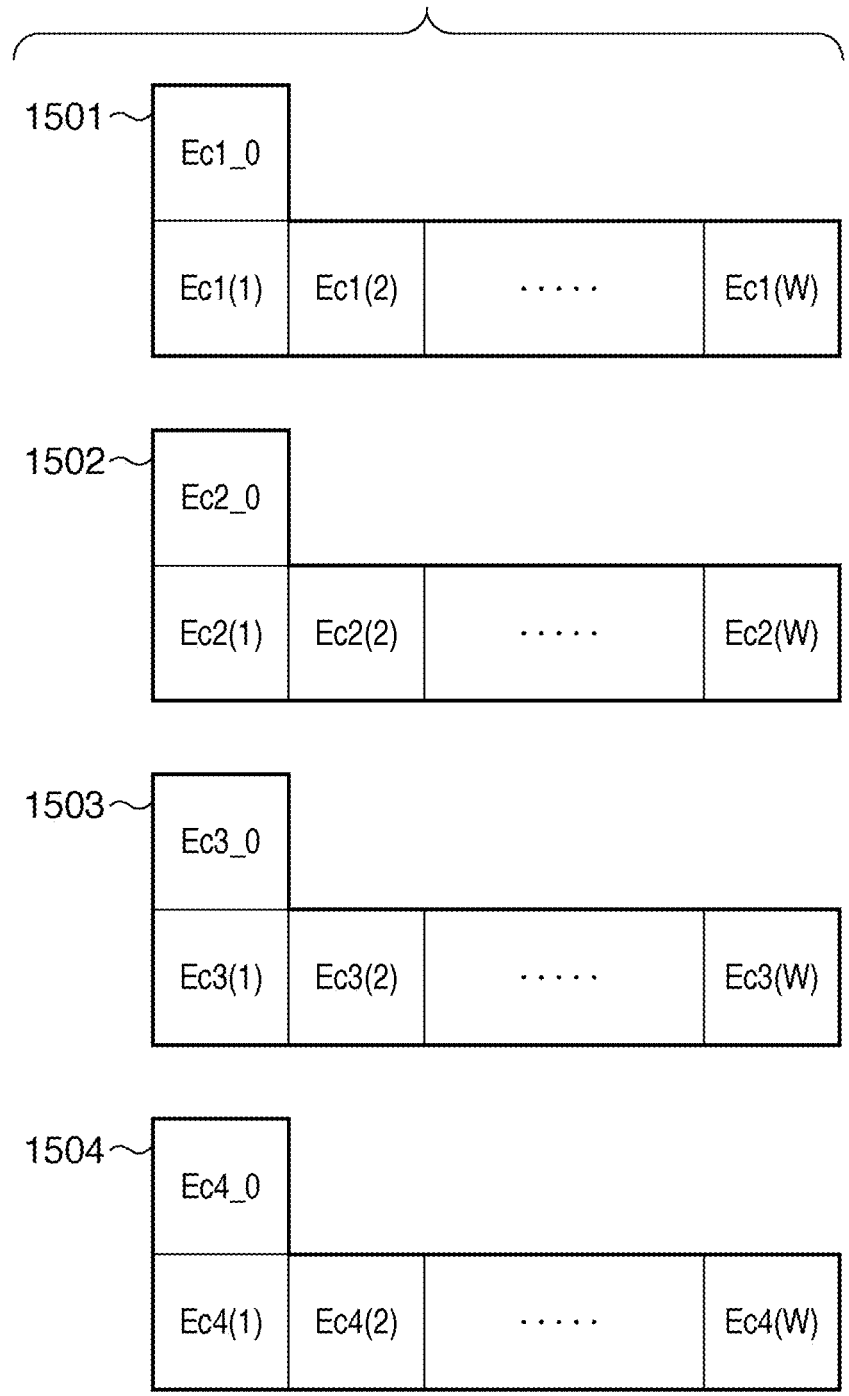
FIG. 16 shows printing areas of each of cyan line buffers in this embodiment.

The cyan line buffers 402, 403, 404, and 405 are respectively constituted from four groups of memories 1501 to 1504 in FIG. 16. Specifically, these are four groups "Ec1_0, Ec1(x)", "Ec2_0, Ec2(x)", "Ec3_0, Ec3(x)", and "Ec4_0, Ec4(x)". For example, the cyan (4n+1) line buffer 402 has one memory Ec1_0, and memories Ec1_(x) (where x=1 to W) where W is a number of horizontal pixels of an input image. Also, the respective cyan line buffers 402, 403, 404, and 405 are each initialized with the initialization value 0, only when starting processing for scan number k=1, 2, 3, or 4. For example, when starting processing for the scan number k=5, the (4n+1) line buffer 402 is not initialized.

In the present embodiment, the above-described four groups of line buffers are necessary per color, and it is necessary to prepare line buffers for four colors. That is, a total of 4×4=16 line buffers are necessary.

Here, half-tone processing for the scan number k=1 is described as an example, thus error diffusion processing is performed using the cyan (4n+1) line buffer 402. That is, in an accumulated error adding unit 406, for an input data that is the total of the scan-duty and the constraining information, an error Ec1(x) that corresponds to the horizontal pixel position x of input pixel data is calculated. That is, the following formula holds, where data of interest that has been input is Ic and data after accumulated error addition is Ic'.

$$Ic'=Ic+Ec1(x) \qquad (31)$$

Next, in Step S203, a threshold value selection unit 407 selects a threshold value T. The threshold value T, for example, is configured as indicated below.

$$T=128 \qquad (32)$$

Alternatively, in order to avoid prolonging dot generation, the threshold value T may be finely changed according to C_d as indicated below, such that an average quantization error decreases.

$$T=f(C\_d) \qquad (33)$$

Next, in Step S204, a quantization unit 408 compares the image data Ic' after error addition to the threshold T, and determines an Out_c, which is the result of binary conversion of the dot. The rules for that determination are as follows.
When Ic'<T, $$Out\_c=0 \qquad (34)$$

When Ic'≧T, $$Out\_c=1 \qquad (35)$$

Next, in Step S205, an error computation unit 409 calculates a differential Err_c between the image data Ic' obtained by adding the error to the pixel of interest Ic, and the output pixel value Out_c, as follows.

$$Err\_c(x)=Ic'-(Out\_c \times 255) \qquad (36)$$

Here, the data prior to half-tone processing is data having 256 tones, which can have a value between 0 and 255. When tonal number differs from 256, coefficients (in this case 255) may be changed according to level.

Next, in Step S206, an error diffusion unit 410 diffuses errors. That is, diffusion processing of the error Err_c(x) corresponding to the horizontal pixel position x is performed using the cyan (4n+1) line buffer 402, as described below.

$$Ec1(x+1) \leftarrow Ec1(x+1)+Err\_c(x)\times 7/16 (x<W)$$

$$Ec1(x-1) \leftarrow Ec1(x-1)+Err\_c(x)\times 3/16 (x>1)$$

$$Ec1(x) \leftarrow Ec1\_0+Err\_c(x)\times 5/16 (1<x<W)$$

$$Ec1(x) \leftarrow Ec1\_0+Err\_c(x)\times 8/16 (x=1)$$

$$Ec1(x) \leftarrow Ec1\_0+Err\_c(x)\times 13/16 (x=W)$$

$$Ec1\_0 \leftarrow Err\_c(x)\times 1/16 (x<W)$$

$$Ec1\_0 \leftarrow 0 (x=W) \qquad (37)$$

Thus, binary conversion for the scan number k=1 (quantized values are 0 or 1) is completed for one pixel of cyan. Note that in the above-described diffusion processing, the processing direction is always to the right, as shown in FIG. 15 (in FIG. 15, "processing direction→"), but the processing direction may be switched between right and left for each Y address of the image, for example.

By performing the processing in the above-described Steps S201 to S206 for addresses (0, 0) to (W−1, Nozl−1) within a band (S207), it is possible to determine the dot positions of half-tone image data, that is, whether dots are on or off.

Figure 17:
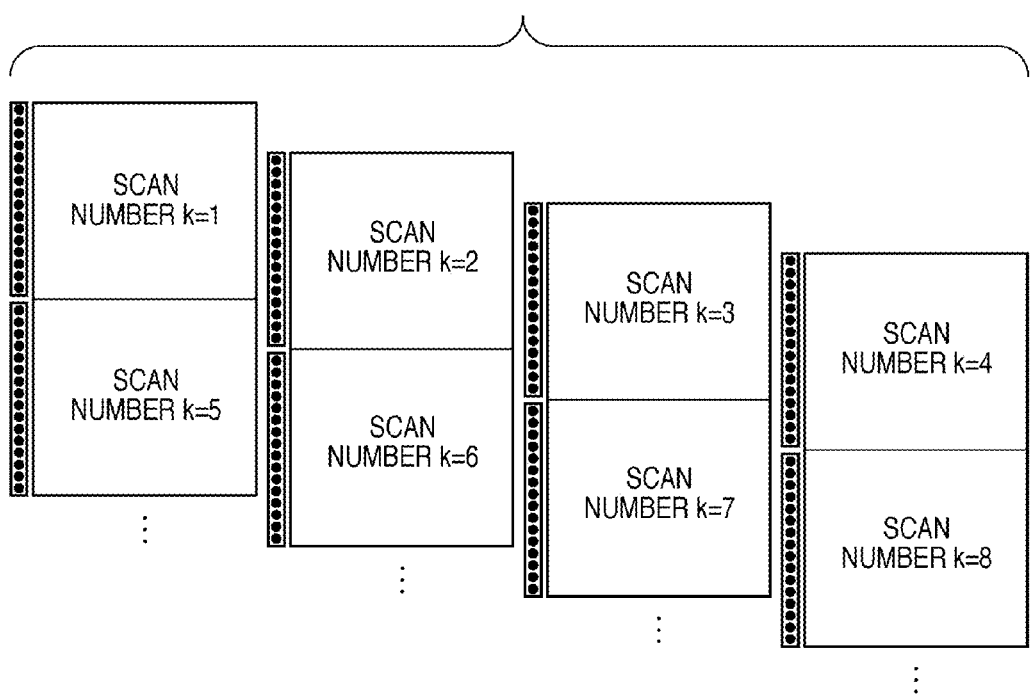
FIG. 17 shows how print regions are adjacent in this embodiment.

Above, a case when the scan number k=1 is described, but the above half-tone processing using the respective cyan line buffers 403 to 405 is performed also for the scan number k=2 to 4. In the processing for the scan number k=5, the cyan (4n+1) line buffer 402, which is also used for the scan number k=1, is used as-is without being initialized (without substituting 0 for all values). This is for the purpose of applying the saved accumulated error as-is to the lower adjacent region, since the print regions of scan number k=1 and the scan number k=5 are vertically adjacent as shown in FIG. 17. If the cyan line buffer 402 is initialized when k=5, an error is not saved in the border region adjacent to k=1, and dot continuity will not be kept.

Figure 18:
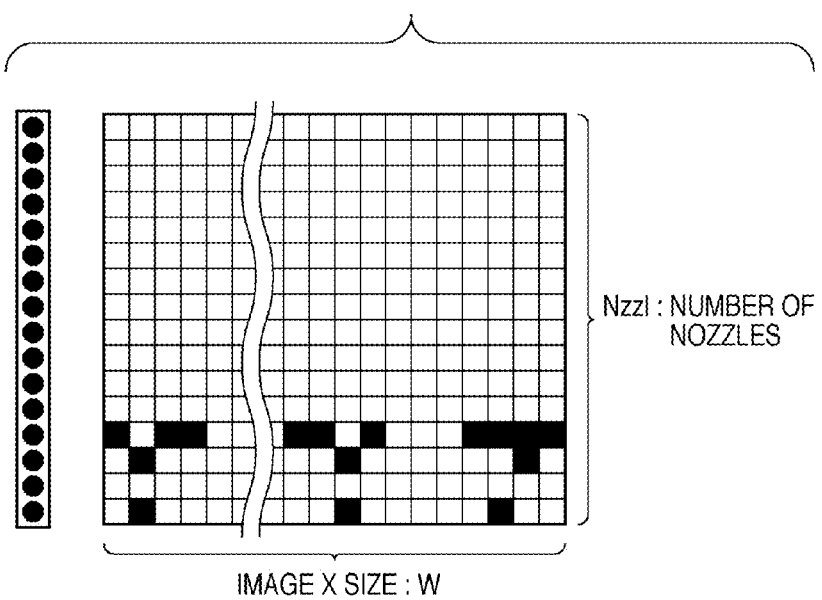
FIG. 18 shows an example of storage of results of second half-tone processing in this embodiment.

Returning to FIG. 3, after the second half-tone processing in Step S108 as described above ends, the binary image data after the second half-tone processing is stored in the half-tone image buffer 112 (S109). Here, FIG. 18 shows how the results of half-tone processing of the scan-duty for scan number k=1 are stored in the half-tone image buffer 112. As shown in FIG. 18, binary image data of (number of nozzles: Nzzl)×(image X size: W) pixels, each corresponding to the pixel position for the scan-duty, are stored in the half-tone image buffer 112.

Thus, half-tone processing for scan number k=1 ends, and as a result, the binary image formed in one movement of the head is stored for each color in the half-tone image buffer 112 of the each color.

Next, the band data in which the vertical direction corresponds to the number of nozzles (Nzzl) and the horizontal direction corresponds to the X size (W) of the image, and that has been accumulated in the half-tone image buffer 112, is output from the image output terminal 114 (S110).

Figure 19:
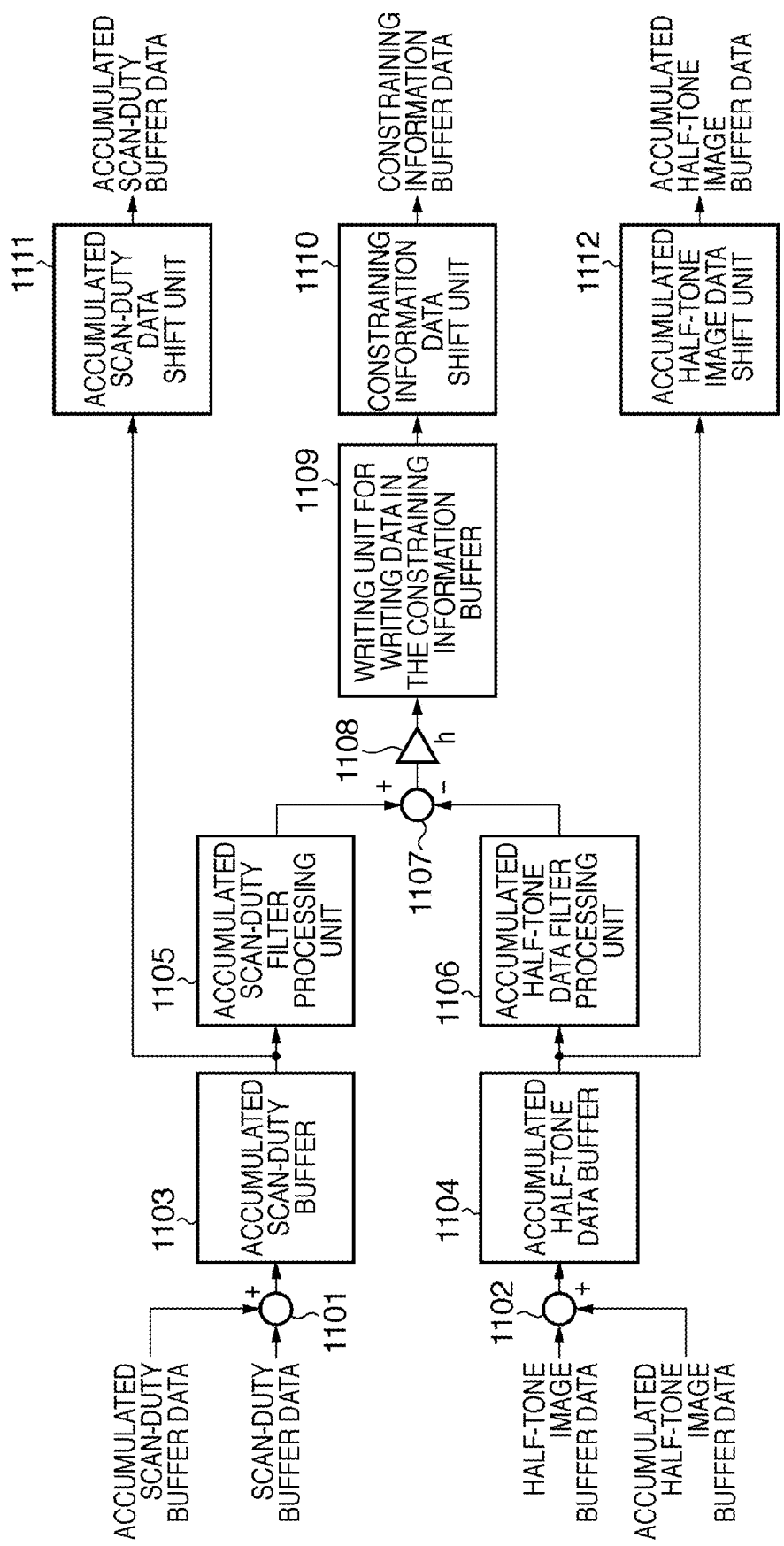
FIG. 19 is a block diagram that shows a detailed configuration of constraining information computation unit dealing with cyan data, in this embodiment.

Then, constraining information is computed in the constraining information computation unit 113 (S111). Below, constraining information computation processing in the present embodiment is described in detail with reference to a block diagram in FIG. 19 and a flowchart in FIG. 20, and in order to simplify the description, computation of constraining information for cyan for 4-pass printing is described for the scan number k=1 as an example. FIG. 19 is a block diagram that shows the detailed configuration of the constraining information computation unit 113, and FIG. 20 is a flowchart that shows constraining information computation processing in the constraining information computation unit 113.

As shown in FIG. 19, the constraining information computation unit 113 is provided with an accumulated scan-duty buffer 1103 and an accumulated half-tone data buffer 1104, and constraining information is computed using accumulated data stored in these buffers.

Here, the constraining information is, as described above, information that indicates the likelihood that a dot will be formed at each position, which is referred to when determining the dot arrangement of a half-tone image for the scan number k+1 which is subsequent to the present scan number k. That is, with the constraining information computation unit 113, constraining information is created that is referred to by the second half-tone processing unit 110 when the next main scanning is performed.

Figure 20:
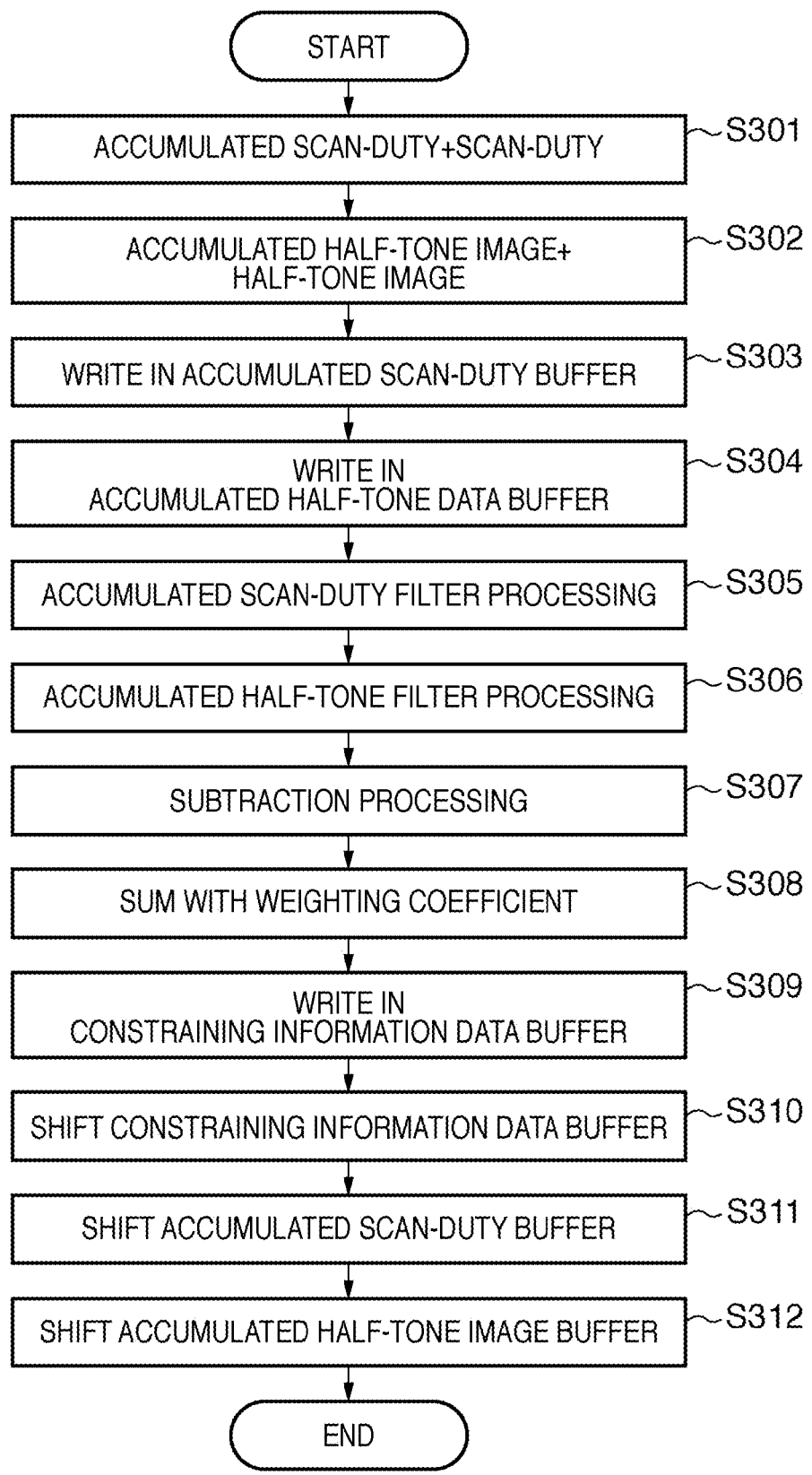
FIG. 20 is a flowchart that shows constraining information computation processing in this embodiment.

First, in Step S301 in FIG. 20, in an adding unit 1101 shown in FIG. 19, cyan duty data in the scan-duty buffer 109 is added to data held in the accumulated scan-duty buffer 1103. Here, 0 is substituted as initial values in the accumulated scan-duty buffer 1103, and when the scan number k=1, the data of each color is as described below. Also, the respective buffer data (accumulated values) of each color at an address (x, y) is $C\_sum\_d(x, y)$, $M\_sum\_d(x, y)$, $Y\_sum\_d(x, y)$, and $K\_sum\_d(x, y)$. Also, $0 \leq nx <$ image X size, and $0 \leq ny < Nzzl$.

$$C\_sum\_d=(nx,ny)=0 \quad (38)$$

$$M\_sum\_d=(nx,ny)=0 \quad (39)$$

$$Y\_sum\_d=(nx,ny)=0 \quad (40)$$

$$K\_sum\_d=(nx,ny)=0 \quad (41)$$

Below, the description will be made only to cyan. Here, an accumulated scan-duty data $C\_sum\_d'$ after addition in Step S301 is calculated as follows.

$$C\_sum\_d'=C\_d+C\_sum\_d \quad (42)$$

Next, in Step S302, in an adding unit 1102 shown in FIG. 19, half-tone data and the data held in the accumulated half-tone data buffer 1104 are added. Here, 0 have been substituted also for the accumulated half-tone data buffer as initial values, and when the scan number k=1, the data of each color is as described below. The buffer data of each color CMYK at the address (x, y) is respectively indicated as follows. That is, the respective buffer data of each color at an address (x, y) is $Out\_c\_sum (x, y)$, $Out\_m\_sum (x, y)$, $Out\_y\_sum (x, y)$, and $Out\_k\_sum (x, y)$. Also, $0 \leq nx <$ image X size, and $0 \leq ny < Nzzl$.

$$Out\_c\_sum=(nx,ny)=0 \quad (43)$$

$$Out\_m\_sum=(nx,ny)=0 \quad (44)$$

$$Out\_y\_sum=(nx,ny)=0 \quad (45)$$

$$Out\_k\_sum=(nx,ny)=0 \quad (46)$$

Below, the description will be made only to cyan. Here, an accumulated half-tone data $Out\_c\_sum'$ after addition in Step S302 is calculated as follows.

$$Out\_c\_sum'=Out\_c+Out\_c\_sum \quad (47)$$

Here, Out_c is a half-tone data, and therefore is a value of 0 or 1. Also, Out_c_sum is accumulated data of Out_c, and therefore is a value that is 0 or a multiple of 1 (i.e., an integer). For example, when Out_c=1 and Out_c_sum=1, Out_c_sum' is 2, and when Out_c=1 and Out_c_sum=2, Out_c_sum' is 3.

Next, in Step S303, the accumulated scan-duty data C_sum_d' calculated in above formula (42) is written to the accumulated scan-duty buffer 1103. This processing is indicated in the formula below.

$$C\_sum\_d \leftarrow C\_sum\_d' \quad (48)$$

Next, in Step S304, the accumulated half-tone data Out C_sum' calculated in above formula (47) is written to the accumulated half-tone data buffer 1104. This processing is indicated in the formula below.

$$Out\_c\_sum \leftarrow Out\_c\_sum' \quad (49)$$

Next, in Step S305, in an accumulated scan-duty filter processing unit 1105, filter processing is performed on the C_sum_d held in the accumulated scan-duty buffer 1103. In this filter processing, as indicated in the formula below, C_sum_df is calculated using a two-dimensional Gaussian filter $F\_m(C\_sum\_d, x, y)$ that is variable according to C_sum_d.

$$C\_sum\_df=C\_sum\_d*F\_m(C\_sum\_d,x,y) \quad (50)$$

Note: * indicates convolution

The two-dimensional Gaussian filter F_m is expressed as the formula below.

$$F\_m=F'm/Sum\_m \quad (51)$$

In formula (51), Sum_m is the total value of the F'm coefficient. Also, F'm is expressed by the formula below.

$$F'\_m(C\_sum\_d, x, y) = \frac{1}{2\pi\sigma_x(C\_sum\_d)\sigma_y(C\_sum\_d)}\exp\left\{-\frac{1}{2}\left(\left(\frac{x}{\sigma_x(C\_sum\_d)}\right)^2 + \left(\frac{y}{\sigma_y(C\_sum\_d)}\right)^2\right)\right\} \quad (52)$$

In formula (52), the values of $\sigma x(C\_sum\_d)$ and $\sigma y(C\_sum\_d)$ change according to the accumulated scan-duty data C_sum_d.

Here, a specific example of the filter F_m is indicated by reference numerals 2101 and 2102 in FIG. 21. In order to simplify the description in the present embodiment, an example in which the filter size is a 3×3 square is shown, but this is not a limitation of the present invention. For example, the filter size may be a 5×5, 7×7, or 9×9 square, or may be a 3×5, 5×7, or 5×9 rectangle. Also, the filter is not limited to having low pass characteristics, and may also have band pass characteristics or high pass characteristics.

Figure 22:
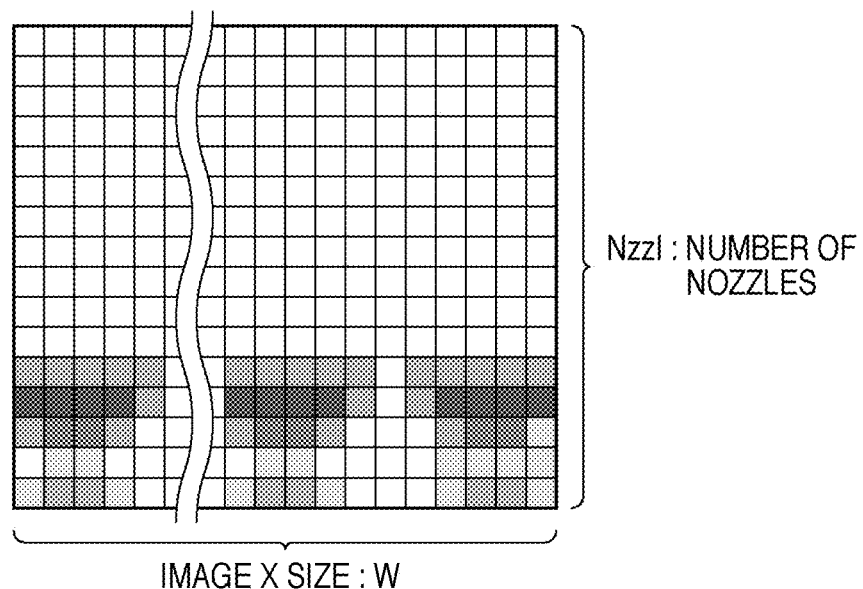
FIG. 22 is a schematic diagram of accumulated scan-duty data, after filter processing in the constraining information computation of this embodiment.

The filter 2101 shown in FIG. 21 indicates an example in which the size is 3×3, and when C_sum_d=30, σx (C_sum_d)=1.0 and σy(C_sum_d)=1.0. The filter 2102 indicates an example in which the size is 3×3, and when C_sum_d=40, σx(C_sum_d)=0.9 and σy(C_sum_d)=0.9. That is, according to FIG. 21, it is understood that the filter coefficient of the filter F_m changes according to C_sum_d. FIG. 22 shows a schematic view of filter-processed accumulated scan-duty data.

Next, in Step S306, in an accumulated half-tone data filter processing unit 1106, filter processing is performed on the Out_c_sum held in the accumulated half-tone data buffer 1104. In this filter processing, as indicated in the formula below, Out C_sum_LPF is calculated using a two-dimensional Gaussian filter LPF_b(C_sum_d, x, y) that is variable according to C_sum_d.

$$Out\_c\_sum\_LPF=(Out\_c\_sum*LPF\_b)\times 255 \quad (53)$$

The reason for multiplying by 255 on the right side in formula (53) is in order to match the data range of the Out_c_sum_LPF and C_sum_df used in below-described formula (56).

Also, the two-dimensional Gaussian filter LFP_b used here is expressed as the formula below.

$$LPF\_b=LPF'b/\text{Sum}\_b \quad (54)$$

In formula (54), Sum_b is the total value of the LPF"b coefficient. LPF"b is expressed by the formula below.

$$LPF'\_b(C\_sum\_d, x, y) = \qquad (55)$$
$$\frac{1}{2\pi\sigma_x(C\_sum\_d)\sigma_y(C\_sum\_d)}\exp\left\{-\frac{1}{2}\left(\left(\frac{x}{\sigma_x(C\_sum\_d)}\right)^2 + \left(\frac{y}{\sigma_y(C\_sum\_d)}\right)^2\right)\right\}$$

In formula (55), the values of σx (C_sum_d) and σy(C_sum_d) change according to the accumulated scan-duty data C_sum_d.

Here, a specific example of the filter LPF_b is indicated by reference numerals 2103 and 2104 in FIG. 21. In the present embodiment, with respect to LPF_b, same as F_m, an example in which the filter size is a 3×3 square is shown, but this is not a limitation of the present invention. For example, the filter size may be a 5×5, 7×7, or 9×9 square, or may be a 3×5, 5×7, or 5×9 rectangle. Also, in order to obtain adequate effects, it is desirable that the σ value increases as C_sum_d decreases. Also, LPF_b can have low pass characteristics.

Figure 23:
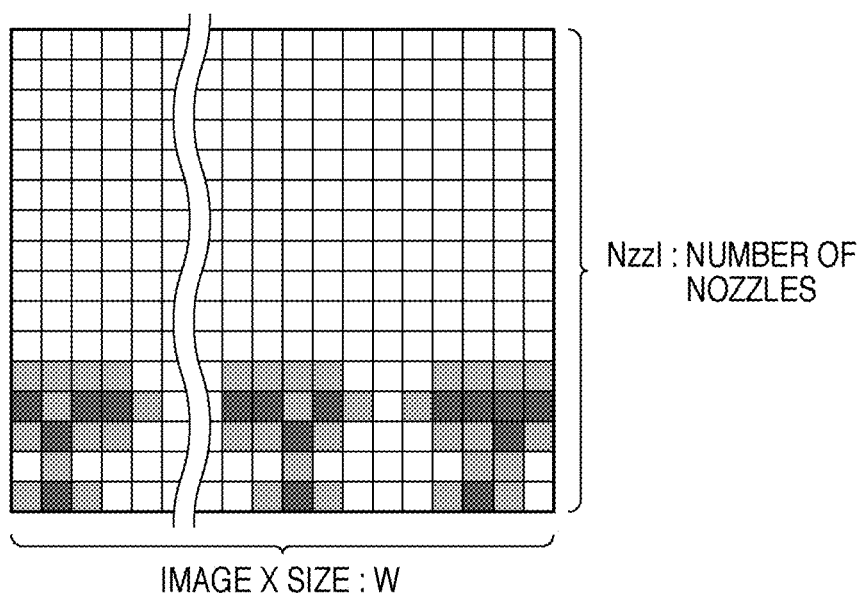
FIG. 23 is a schematic diagram of accumulated half-tone data, after filter processing in the constraining information computation of this embodiment.

As shown in FIG. 21, it is understood that the filter coefficient of LFP_b changes according to the accumulated scan-duty data C_sum_d, similarly to F_m. Also, according to FIG. 21, in the present embodiment, the same filter coefficient is used for both F_m and LPF_b as an example, but of course different coefficients may also be used. FIG. 23 is a schematic diagram of filter-processed accumulated half-tone data.

Next, in Step S307, in a subtracting unit 1107, the data calculated by the accumulated half-tone data filter processing unit 1106 is subtracted from the data calculated by the accumulated scan-duty filter processing unit 1105. Then, in Step S308, in a weight summing unit 1108, by summing a weighting coefficient h (real number), constraining information C_r is obtained. The processing in Steps S307 and S308 is expressed as in the formula below.

$$C\_r\leftarrow(-Out\_c\_sum\_LPF+C\_sum\_df)\times h \quad (56)$$

Next, in Step S309, in a writing unit 1109 for writing data in the constraining information buffer, the data C_r obtained in formula (56) is written in the constraining information buffer 111. The constraining information C_r calculated according to formula (56) in this way is held in the constraining information buffer 111 as constraining information for half-tone processing for the next scan number k=2 and subsequent scan numbers (i.e., scan number k+1 relative to the present scan number k).

Next, in Step S310, in a constraining information buffer shifting unit 1110, the constraining information C_r written to the constraining information buffer 111 is shifted upward by LF=Nzzl/Pass=16/4=4 which corresponds to one feeding of the paper. The constraining information data shifted here is calculated from the formula below. Here, 0≦nx<image X size, and 0≦ny<Nzzl.

$$C\_r(nx,ny)=C\_r(nx,ny+LF) \quad (57)$$

In formula (57), when ny+LF≧Nzzl, C_r(nx,ny)=0. That is, 0 is substituted for LF nozzles (in this case, 4 nozzles) at the lower end after shifting.

Next, in Step S311, in a shifting unit 1111 for shifting the accumulated scan-duty data, the C_sum_d held in the accumulated scan-duty buffer 1103 is shifted upward by LF=Nzzl/Pass=16/4=4 which corresponds to one feeding of the paper. The accumulated scan-duty data shifted here is calculated from the formula below. Here, 0≦nx<image X size, and 0≦ny<Nzzl.

$$C\_sum\_d(nx,ny)=C\_sum\_d(nx,ny+LF) \quad (58)$$

In formula (58), when ny+LF≧Nzzl, C_sum_d(nx, ny)=0. That is, 0 is substituted for LF nozzles (in this case, 4 nozzles) at the lower end after shifting.

Figure 24:
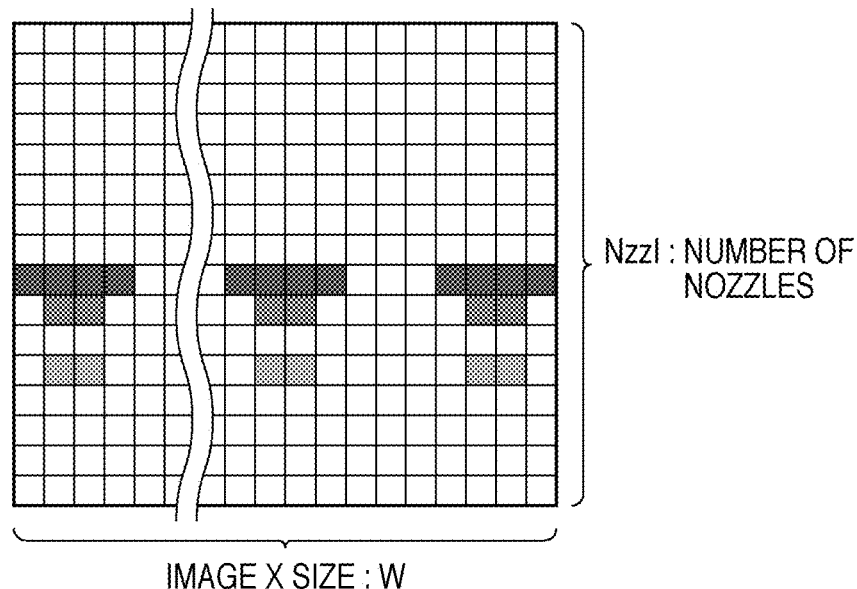
FIG. 24 is a schematic diagram of accumulated scan-duty data, after shifting in the constraining information computation of this embodiment.

Here, FIG. 24 is a schematic diagram of accumulated scan-duty data that has been shifted in the above manner.

Likewise in Step S312, in an accumulated half-tone data shifting unit 1112, the Out_c_sum held in the accumulated half-tone data buffer 1104 is shifted upward by the amount which corresponds to one feeding of the paper. Here, the shifted accumulated half-tone data is calculated in the manner below. Here, 0≦nx<image X size, and 0≦ny<Nzzl.

$$Out\_c\_sum(nx,ny)=Out\_c\_sum(nx,ny+LF) \quad (59)$$

In formula (59) as well, when ny+LF≧Nzzl, Out_c_sum (nx, ny)=0. That is, 0 is substituted for LF nozzles (in this case, 4 nozzles) at the lower end after shifting.

Figure 25:
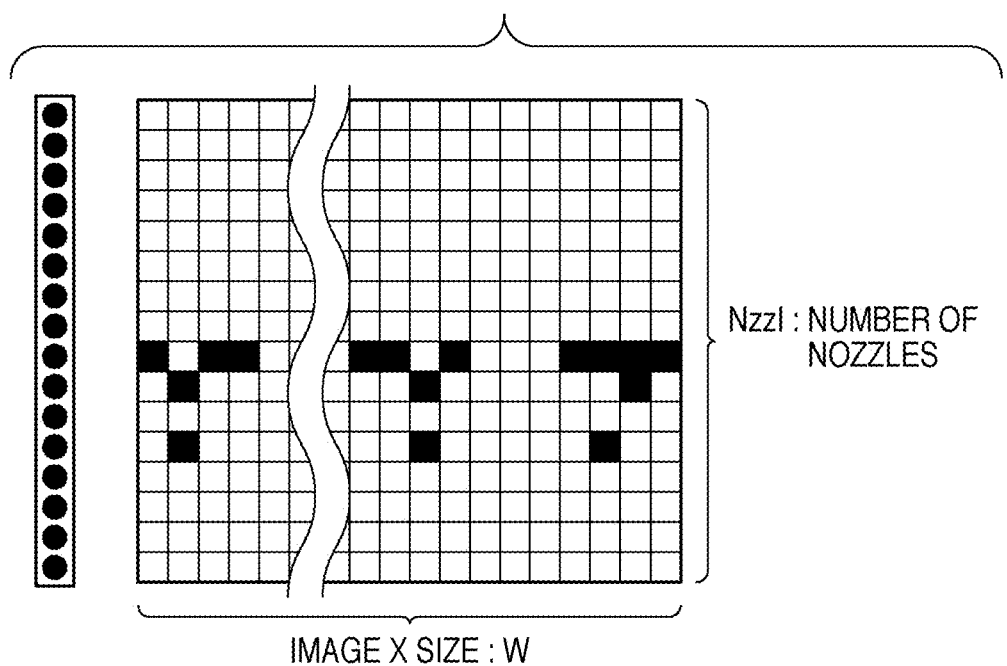
FIG. 25 is a schematic diagram of accumulated half-tone data, after shifting in the constraining information computation of this embodiment.

Here, FIG. 25 is a schematic diagram of accumulated half-tone data that has been shifted in the above manner. With the processing shown in the flowchart in FIG. 20 described above, the constraining information computation processing in Step S111 of the present embodiment ends.

Following is a detailed description of above formula (56) which indicates the method of updating constraining information in the present embodiment.

$$C\_r\leftarrow(-Out\_c\_sum\_LPF+C\_sum\_df)\times h \quad (56)$$

First, Out_c_sum_LPF in formula (56) is data obtained by extracting only a low-frequency component of an accumulated half-tone image, using LPF_b in the accumulated half-tone data filter processing unit 1106.

In formula (56), −Out_c_sum_LPF is obtained by applying a negative sign to Out_c_sum_LPF, and by subtracting this from C_sum_df, data without the low-frequency component is created. Thus, dot formation becomes unlikely for the next scan number k+1 and subsequent scan numbers. That is, with this processing, according to the low-frequency component, the phase of a half-tone image formed in and before scan number k, becomes opposite to the phase of a half-tone image formed in the next scan number k+1 and subsequent scan numbers.

In this way, in the present embodiment, with −Out_c_sum_LPF, the low-frequency component of previously formed dots becomes opposite phase. Effects that can be obtained by making only the low-frequency component opposite phase will be described below with reference to FIG. 26.

Figure 26:
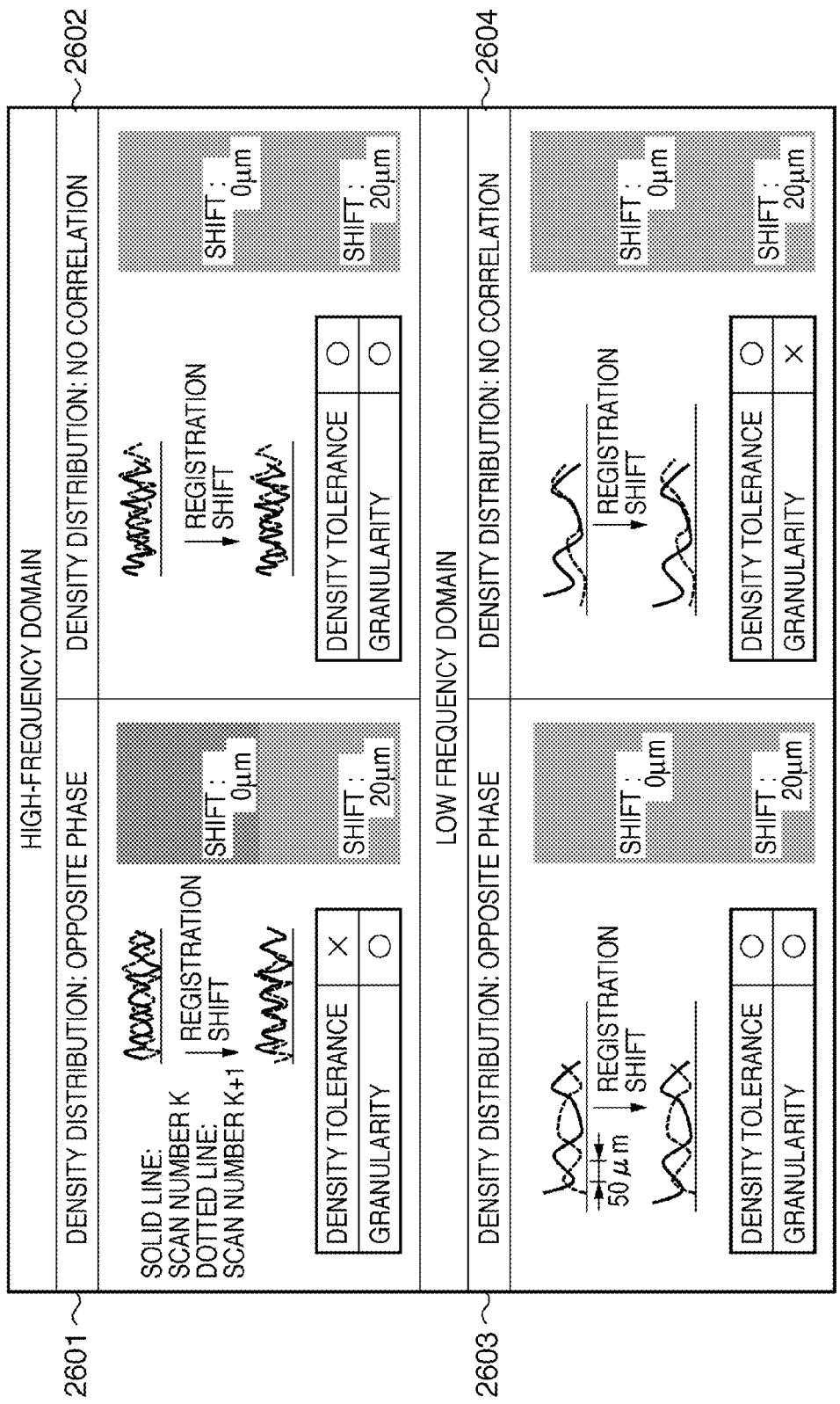
FIG. 26 shows anti-registration shift properties for different frequency domain of a print image in this embodiment.

FIG. 26 schematically shows changes in a print image due to registration shift, according to each of a high-frequency domain and a low-frequency domain. First, the high-frequency domain of the print image will be explained. In a case where the density distributions of scan number k and scan number k+1 become opposite phase (2601), peaks and valleys of the density distribution are interpolated when there is no registration shift, and blank portions are unlikely to be produced on the paper because dots uniformly cover the paper face. Therefore, density becomes high. However, if there is even a slight amount of shift (20 μm in FIG. 26) for example, there is a tendency that the density distributions of scan number k and scan number k+1 overlap. In this case, blank portions are likely to be visible on the paper, resulting in lower density. That is, when the density distribution of the high-frequency component in the print image becomes opposite phase, the density tolerance of registration shift decreases. However, in a case where the density distribution for the high-frequency component has no correlation (2602), density is unlikely to change even if some amount of registration shift occurs and thus granularity does not substantially worsen.

On the other hand, with respect to the low-frequency domain of the print image, when the density distribution becomes opposite phase (2603), the visually offensive low-frequency component is reduced and so worsening of granularity is suppressed. Furthermore, even if some amount of registration shift occurs, there will be substantially no change in the relationship of peaks and valleys in the distribution, so density tolerance will be strong. However, when there is no correlation of density distribution for the low-frequency component (2604), regardless of whether or not registration shift occurs, the low-frequency component is apparent in the image, so granularity worsens.

As described above, according to FIG. 26, in order to be tolerant to density irregularity caused by registration shift in the print image, and thus to have good granularity, the following two properties between scans are understood to be important. That is, it is important to 1) make the visually offensive low-frequency component opposite phase, and 2) not make the high-frequency component opposite phase, so that there is no correlation.

Here, the properties to be realized between adjacent scans of scan number k and k+1 were stated, but these properties can also be realized between any other scans.

Next, attention is focused on C_sum_df in formula (56). C_sum_df in formula (56) is data obtained by filtering accumulated duty data using F_m in the accumulated scan-duty filter processing unit 1105. In formula (56), this C_sum_df is added, and there are the following two reasons for doing so.

The first reason is that by setting the average value within the brackets in formula (56) to 0, the average of the constraining information C_r is always kept at 0, so the density of half-tone processing will be close to the scan-duty density. This is because the Ic indicated in formula (30) will become smaller than C_d, if only data having a negative value due to the above-described –Out_c_sum_LPF are used as constraining information, and then the number of dots in half-tone processing will be reduced. Because operation in the error diffusion method is such that the input density and the output density are always the same, it is necessary to always keep the average of C_r to be 0. Here, C_sum_df has the same density as Out_c_sum_LPF (which is obtained by multiplying 255 in formula (53)), so by adding C_sum_df, the average of C_r can always be kept to be 0.

The second reason is in order to control spatial frequency properties of the output image. As described above, it is necessary for the average value within the brackets in formula (56) to be 0, but when multiplying LPF_b by only Out_c_sum_LPF, Out_c_sum_LPF and C_sum_df in the brackets differ in terms of spatial frequency, so edge emphasis occurs. In other words, when gradation processing is performed only on Out_c_sum and not on C_sum_d and then the subtraction is performed, this processing will be equal to unsharp masking, so edge emphasis occurs. Consequently, if the same filter is applied to C_sum_d as Out_c_sum, suppression of edge emphasis is possible.

However, when the print medium is non-coated paper such as standard paper or matte paper, there is a tendency for the outline of an image to soften, so it is not absolutely necessary to perform the same processing on both C_sum_d and Out_c_sum; for example, the expansion rate of F_m may be reduced such that edge emphasis is caused intentionally.

In formula (56), furthermore, it is possible to adjust the strength of constraining information with the weighting coefficient h. For example, when h=1.0, the constraining information computed with the filter can be output as-is, and when h=0.0, the obtained output will be equal to the output without computing the constraining information. Also, because the average is 0 within the brackets in formula (56), an average value will be maintained to be 0 regardless of the value of h.

Figure 3:
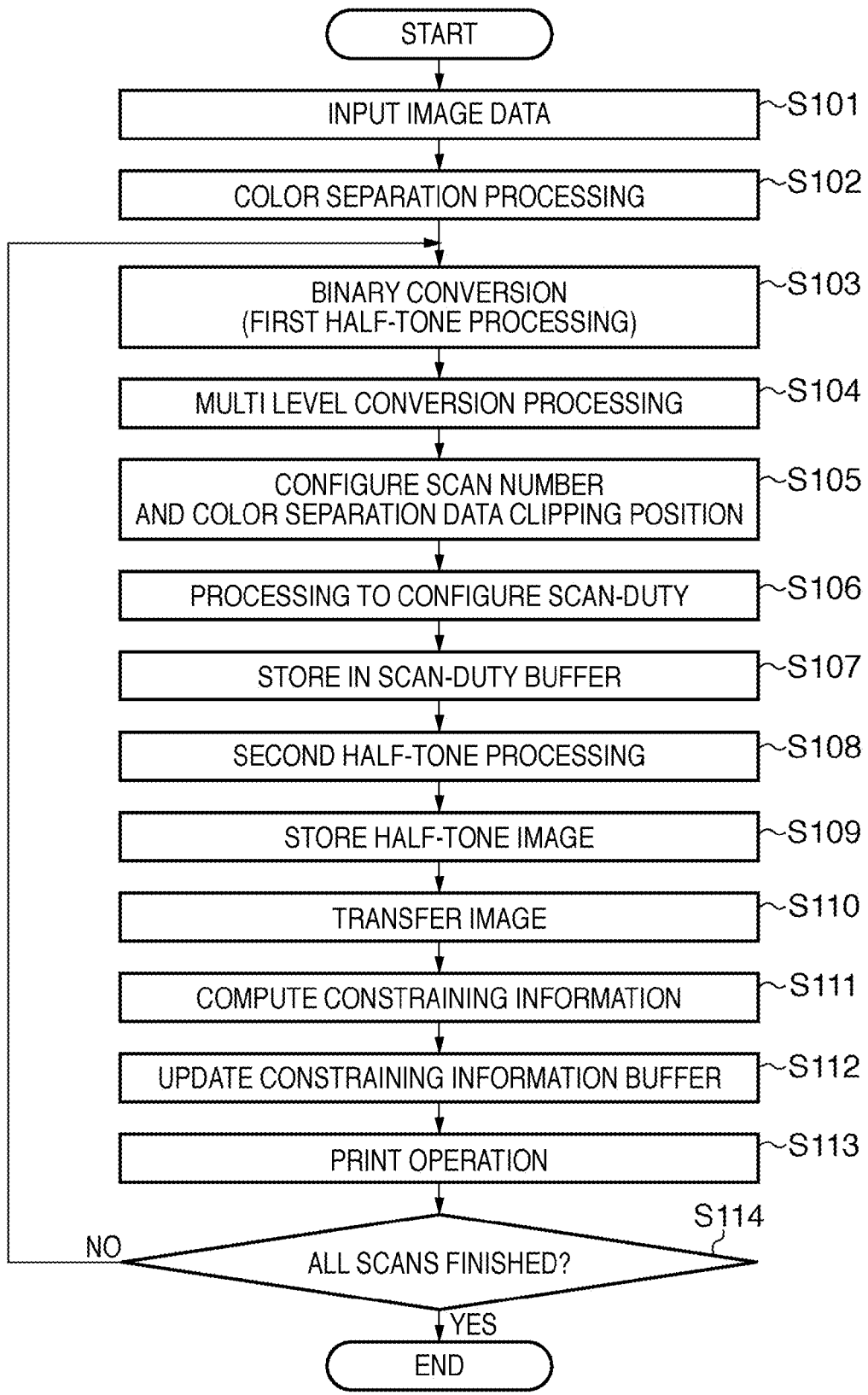
FIG. 3 is a flowchart that shows image forming processing in this embodiment.

Here the description of constraining information computing processing in Step S111 in FIG. 3 ends.

Next, in Step S112, the constraining information buffer 111 is updated with the computation results of constraining information obtained in Step S111. The constraining information thus updated is referred to as information for determining the dot arrangement of the next scan number and subsequent scan numbers (where if the present scan number is k, the next scan number is k+1).

Here, updating of the constraining information buffer 111 will be described in detail with reference to region 1 in FIG. 6.

In the present embodiment, in half-tone processing for the scan number k=2, it is necessary to make it opposite to the phase of the low-frequency component of the dot pattern of region 1 formed when the scan number k=1. Therefore, according to formulas (47) to (56), the constraining information is shifted upward by LF=Nzzl/Pass=16/4=4 which corresponds with one feeding of the paper, and this shifted constraining information is used as the constraining information for the scan number k=2, as described above.

However, formulas (47) to (56) are not limited to "set the low-frequency component to opposite phase" for the adjacent scan number k=1 and k=2. For example, as shown in FIG. 6, in the half-tone processing for the scan number k=3, the phase of the low-frequency component is set to be opposite to the phase of the total dot pattern of region 1 formed when the scan number k=1 and k=2. Likewise, in the half-tone processing for the scan number k=4, the phase of the low-frequency component is set to be opposite to the phase of the total dot pattern of region 1 formed when the scan number k=1, k=2, and k=3.

That is, in the present embodiment, in the same region on the print medium, the dot pattern of each scan is formed such that its phase of the low-frequency component will be opposite to the phase of the total dot pattern that has already been formed. As a result, regardless of whether registration shift occurs or not, good granularity can always be insured, and density unevenness due to registration shift can be reduced.

Returning to FIG. 3, next, in Step S113, in the inkjet printer 2 that has received half-tone data, ink colors matching the image data are selected, and print operation is started. In Step S113, one main scanning is performed in which, while the recording head 201 moves from left to right relative to the print medium, each nozzle is driven at a fixed drive interval to record an image on the print medium. Furthermore, when the main scanning finishes, one sub-scanning, which is scanning in the direction perpendicular to main scanning, is performed.

Next, in Step S114, a determination is made of whether or not all scanning has finished. If all scanning has finished, one sequence of image forming processing is completed, and if not finished, processing returns to Step S103. Processing ends here.

Figure 27:
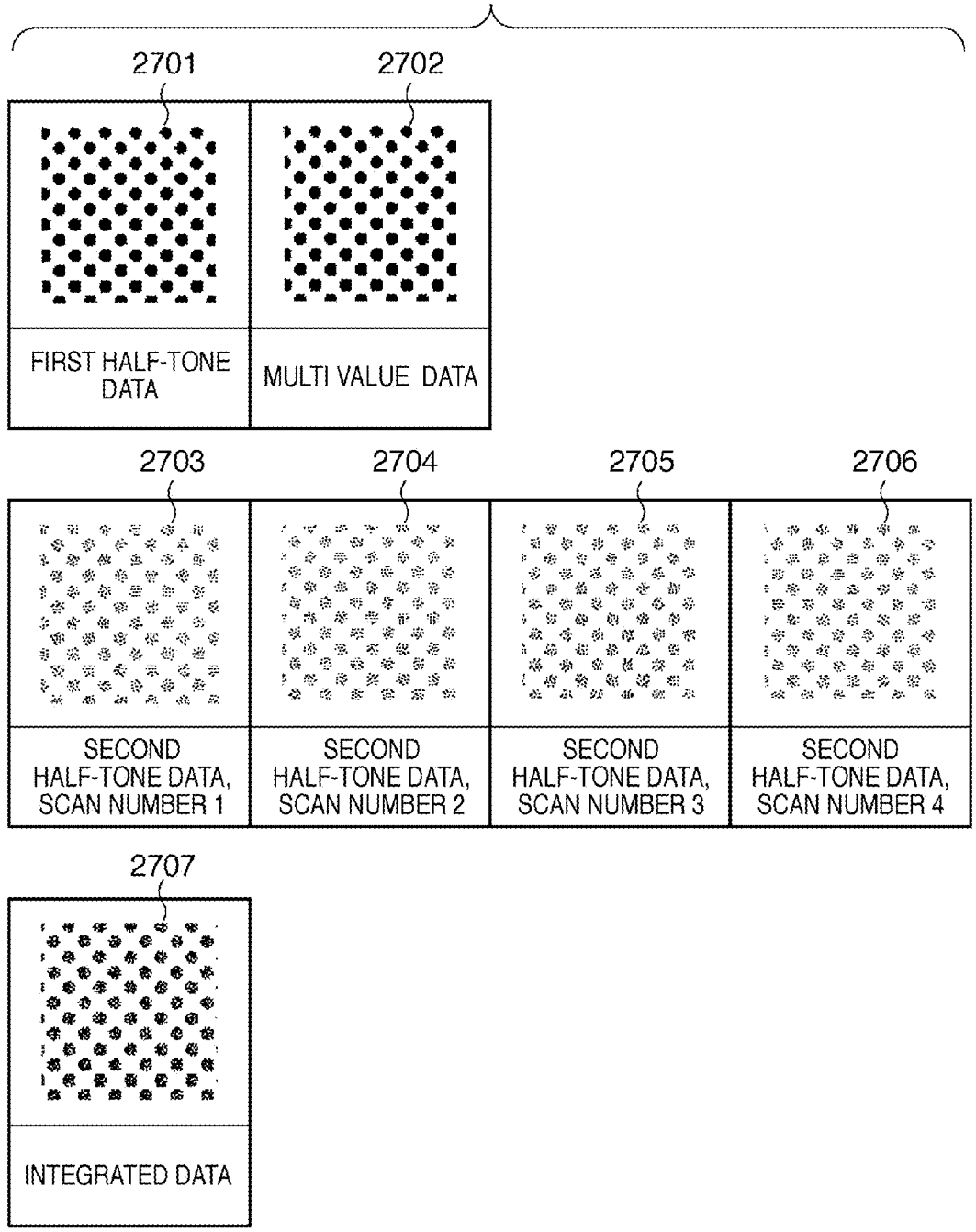
FIG. 27 shows example dot arrangements formed in this embodiment.

Following is a description of the actual dot arrangement for scan numbers k, k+1, k+2, and k+3 in the present embodiment, with reference to FIG. 27. Here, data formed with scan numbers 1, 2, 3, and 4, 920 nozzles, and four passes at the same coordinates of the print medium will be described for example.

In FIG. 27, reference numeral 2701 denotes binary data calculated in the first half-tone processing unit 105, and reference numeral 2702 denotes multi level data calculated in the multi level conversion unit 106. Also, reference numerals 2703, 2704, 2705, and 2706 respectively denote half-tone data from binary data calculated in the second half-tone processing unit 110 and output from the output terminal 114, each corresponding to scan numbers 1, 2, 3, and 4. Also, reference numeral 2707 denotes a final output image (integrated image) in which the half-tone images of each scan 2703, 2704, 2705, and 2706 have been integrated.

Reference numeral 2703 denotes a half-tone image for scan number 1 and for one-fourth of nozzles at the lower end (vertical size is 920/4=230). Likewise, reference numeral 2704 denotes a half-tone image for scan number 2 and for nozzles of the second of four divisions from the lower end, reference numeral 2705 denotes a half-tone image for scan number 3 and for nozzles of the third of four divisions from the lower end, and reference numeral 2706 denotes a half-tone image for scan number 4 and for nozzles of the fourth of four divisions from the lower end (one-fourth of nozzles at the upper end). For example, with respect to the half-tone image 2704 for scan number 2, an image is formed on the same print medium as the half-tone image 2703, so this is a half-tone image for nozzles of the second of four divisions from the lower end.

According to FIG. 27, error diffusion processing of scan-duty data is performed for each scan, so dispersion is high in each of the half-tone images 2703, 2704, 2705, and 2706, and in the integrated image 2707 it can be confirmed that the half-tone dot shape of the original binary data 2701 is reproduced. Furthermore, in the integrated image 2707, the phase of the low-frequency component of the data (dot pattern) printed in each scan is near opposite to the phase of the data (dot pattern) already formed, and the high-frequency component has nearly no correlation with the data already formed, so density unevenness and worsened granularity caused by registration shift will be suppressed.

As described above, according to the present embodiment, for image data having a tone value for each color, first half-tone processing such as AM/FM screen or half-tone dots is performed firstly, and afterward multi level conversion is performed. Thus, it is possible to improve reproduction of an AM/FM screen and half-tone dots. Furthermore, afterward, on multi-level converted data, for each main scanning, second half-tone processing is performed based on constraining information that has been updated in real time based on results of binary conversion in main scanning that has already been performed. Thus, worsening of granularity that is dependent on the low-frequency component of an image is suppressed. Furthermore, by reducing correlation in the high-frequency component, it is possible to reduce density unevenness due to registration shift.

Second Embodiment

Following is a description of a second embodiment according to the present invention. In the first embodiment described above, an example is described in which error diffusion processing is performed in the second half-tone processing unit 110. In the second embodiment, an example is described in which a dithering method is used instead of an error diffusion method. As described above, processing for a dithering method can be performed faster than processing for an error diffusion method, so high-speed processing is possible in the second embodiment, and furthermore, as in the first embodiment, constraining information is generated only with the low-frequency component, so the same effects as in the first embodiment can be obtained.

Figure 28:
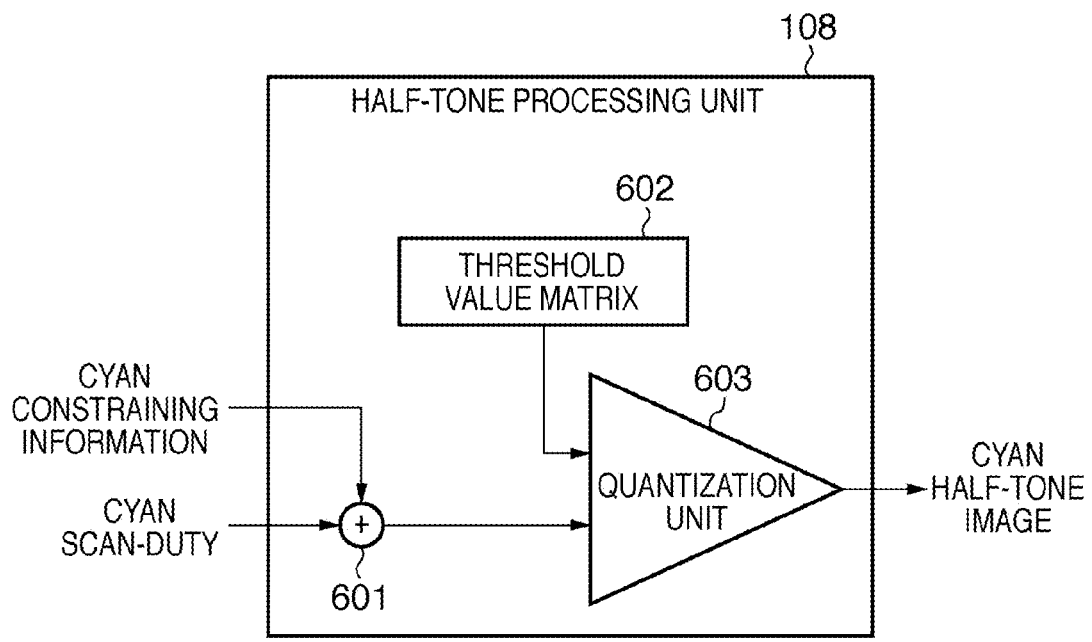
FIG. 28 is a block diagram that shows the detailed configuration of a half-tone processing unit in a second embodiment.
Figure 29:
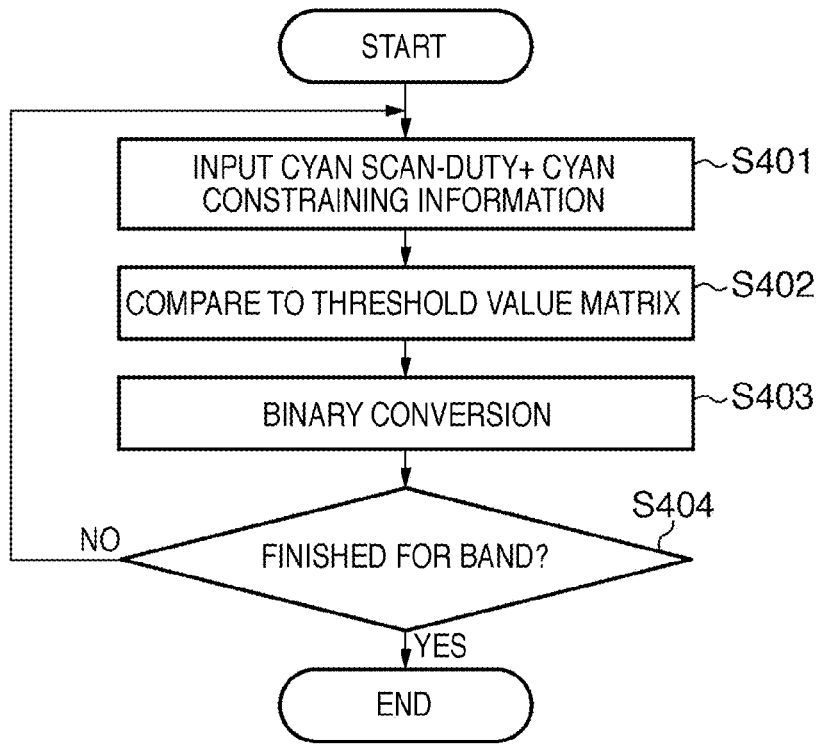
FIG. 29 is a flowchart that shows half-tone processing in the second embodiment.

The detailed configuration of the image forming apparatus in the second embodiment is the same as in the first embodiment, except the second half-tone processing unit 110. Below, in order to simplify the description, same as in the first embodiment, an example of half-tone processing for cyan and for 4-pass printing is described in detail for scan number k=1, with reference to a block diagram in FIG. 28 and a flowchart in FIG. 29. FIG. 28 is a block diagram that shows the detailed configuration of the second half-tone processing unit 110 in the second embodiment, and FIG. 29 is a flowchart that shows the details of the second half-tone processing in the second embodiment.

First, in Step S401 shown in FIG. 29, in a constraining information adding unit 601 shown in FIG. 28, the cyan scan-duty $C\_d$ and total value Ic of the cyan constraining information $C\_r$ are calculated as shown in the formula below. However, all values of the constraining information $C\_r$ are 0 when the scan number k=1.

$$Ic = C\_d + C\_r \quad (60)$$

Figure 30:
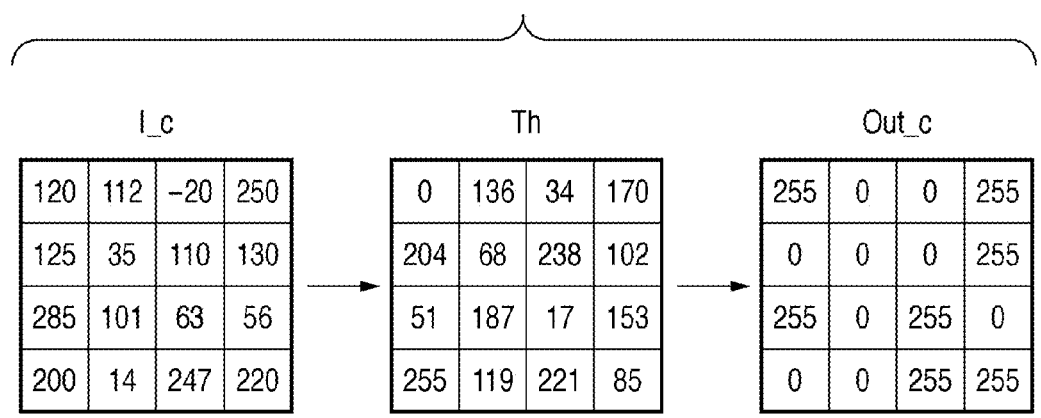
FIG. 30 shows an overview of dither processing in the second embodiment.

Next, in Step S402, in a quantization unit 603, the above Ic is compared to a corresponding factor of a threshold value matrix 602, and binary-converted data is output in Step S403. Here, FIG. 30 shows an overview of binary conversion by dither processing in the second embodiment. The rules of binary conversion here can be expressed as follows using the factor Th (0 to 255) of the threshold value matrix 602. As shown in FIG. 30, Th is a group of threshold values corresponding to addresses in a print image.

$$\text{When } Ic \leq Th, \text{Out}\_c = 0 \quad (61)$$

$$\text{When } Th \leq I\_c, \text{Out}\_c = 1 \quad (62)$$

A commonly known threshold value matrix may be used for Th in the second embodiment. For example, a Bayer array may be used, a dot-concentrated array may be used, or a blue noise mask array may be used. Also, different matrices may be used for each scan number as the threshold value matrix 602. Alternatively, the same matrix may always be used for each scan number.

In Step S404, the dot position of half-tone data is determined by performing the above-described processing of Steps S401 to S403 for addresses (0, 0) to (W−1, Nzzl−1) in a band. Thus, half-tone processing for scan number k=1 ends, and as a result, the binary image to be formed by one operation of head is stored for each color, in each of a half-tone image buffer 112.

According to the second embodiment as described above, by performing half-tone processing by a dithering method instead of error diffusion, while it is possible to process in a higher speed than in the first embodiment, image forming with high image quality having tolerance for registration shift is possible as in the first embodiment.

Other Embodiments

In each of the embodiments described above, an image processing apparatus was described that employs an inkjet recording system in which a recording head having a plurality of nozzles arranged in a predetermined direction is scanned on a print medium in a direction perpendicular to the direction in which the nozzles are arranged, and ink is discharged on the print medium, thereby forming an image. However, the present invention is also applicable to a recording apparatus that performs recording according to a system other than an inkjet system (e.g., a thermal transfer system or an electrophotographic system). In this case, a nozzle that discharges ink droplets corresponds to a printing element or a laser light-emitting element that records dots. Also, in an electrophotographic system, a photosensitive drum serves as a print medium.

The present invention is also applicable to, for example, a so-called full-line recording apparatus that has a recording head with a length corresponding to the recording width of the print medium, and performs recording by moving the print medium relative to the recording head.

Also, in each of the above embodiments, an example was described in which binary conversion is performed in the first half-tone processing unit 105, multi level conversion is performed in the multi level conversion unit 106, and binary conversion processing is performed in the second half-tone processing unit 110, but the present invention is not limited to this example. That is, a configuration may also be adopted in which first N-levels conversion processing (where N is an integer of at least 2) is performed in the first half-tone processing unit 105 and first N-level data is output, multi level conversion (M-level conversion) to M-level larger than N-level is performed in the multi level conversion unit 106, and M-level data is output. In this case, second N-level conversion processing is performed in the second half-tone processing unit 110, and second N-level data is output. Then, when binary conversion is performed in the first half-tone processing unit 105 and the second half-tone processing unit 110, N is equal to 2.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-311558, filed Dec. 5, 2008 which is hereby incorporated by reference herein in its entirety.

What is claimed is:

1. An image processing apparatus for generating print data to be supplied to an image forming apparatus having a recording head with a plurality of printing elements, wherein the recording head scans the same location on a print medium repeatedly to form an image, the image processing apparatus comprising:
a first half-tone processing unit that performs a first quantization process on input image data to calculate first N-level data, where N is an integer of at least 2, using a screen parameter corresponding to a screen condition of a target device, wherein the first N-level data represents half-tone dots to be reproduced;
a conversion unit that converts the first N-level data to M-level data, where M is an integer greater than N;
a configuring unit that configures printing density for each of the printing elements for each scan, by dividing the M-level data into the printing density for each scan, for respective pixels; and
a second half-tone processing unit that performs a second quantization process on the printing density for the scan of interest to calculate second N-level data to be used by the image forming apparatus, based on a predetermined constraining information for the scan of interest, wherein the constraining information indicates how a dot is likely to be formed at respective pixels.

2. The image processing apparatus according to claim 1, further comprising:
a constraining information computation unit that generates the constraining information for the scan of interest, from the printing density configured for the preceding scan and the result of the second quantization process for the preceding scan,
wherein the constraining information computation unit creates the constraining information so that the phase of a dot pattern for the scan of interest created by the second quantization unit becomes opposite to the phase of the dot pattern that has already been recorded in a printing area for the scan of interest, in a low-frequency domain.

3. The image processing apparatus according to claim 2, wherein the constraining information computation unit creates the constraining information so that the phase of a dot pattern for the scan of interest created by the second quantization unit becomes uncorrelated to the phase of the dot pattern that has already been recorded in a printing area for the scan of interest, in a high-frequency domain.

4. The image processing apparatus according to claim 1, wherein the configuring unit configures a printing density for each of the printing elements by dividing a printing density indicated by the M-level data, according to the position of the printing elements in the recording head.

5. The image processing apparatus according to claim 4, wherein the configuring unit configures a printing density for each of the printing elements so that a total of the printing density for each scan corresponds with the M-level data.

6. The image processing apparatus according to claim 1, wherein the constraining information computation unit generates the constraining information based on an accumulated value of the printing densities configured by the configuring unit.

7. The image processing apparatus according to claim 1, wherein the first and second half-tone processing units perform quantization by an error diffusion method or a dithering method.

8. The image processing apparatus according to claim 1, wherein the image forming apparatus includes a plurality of recording heads, wherein each of the recording heads is for one of the colors.

9. The image processing apparatus according to claim 1, wherein N=2.

10. A method of controlling an image processing apparatus for generating print data to be supplied to an image forming apparatus having a recording head with a plurality of printing elements, wherein the recording head scans the same location on a print medium repeatedly to form an image, the method comprising:
- a first quantization step of performing a first quantization process on input image data to calculate first N-level data, where N is an integer of at least 2, using a screen parameter corresponding to a screen condition of a target device, wherein the first N-level data represents half-tone dots to be reproduced;
- a conversion step of converting the first N-level data to M-level data, where M is an integer greater than N;
- a configuring step of configuring printing density for each of the printing elements for each scan, using by dividing the M-level data into the printing density for each scan, for respective pixels; and
- a second quantization step of performing a second quantization process on the printing density for the scan of interest to calculate second N-level data to be used by the image forming apparatus, based on a predetermined constraining information for the scan of interest, wherein the constraining information indicates how a dot is likely to be formed at respective pixels.

11. A non-transitory computer-readable storage medium storing a program executable by a processor of an image processing apparatus to execute a method of controlling the image processing apparatus for generating print data to be supplied to an image forming apparatus having a recording head with a plurality of printing elements, wherein the recording head scans the same location on print medium repeatedly to form an image, the method comprising:
- a first quantization step of performing a first quantization process on input image data to calculate first N-level data, where N is an integer of at least 2, using a screen parameter corresponding to a screen condition of a target device, wherein the first N-level data represents half-tone dots to be reproduced;
- a conversion step of converting the first N-level data to M-level data, where M is an integer greater than N;
- a configuring step of configuring printing density for each of the printing elements for each scan, by dividing the M-level data into the printing density for each scan, for respective pixels; and
- a second quantization step of performing a second quantization process on the printing density for the scan of interest to calculate second N-level data to be used by the image forming apparatus, based on a predetermined constraining information for the scan of interest, wherein the constraining information indicates how a dot is likely to be formed at respective pixels.

12. An image processing apparatus for generating print data to be supplied to an image forming apparatus having a recording head with a plurality of printing elements, wherein the recording head scans the same location on a print medium repeatedly to form an image, the image processing apparatus comprising:
- a first half-tone processing unit that acquires first N-level data, where N is an integer of at least 2, wherein the first N-level data represent half-tone dots to be reproduced;
- a conversion unit that converts the first N-level data to M-level data, where M is an integer greater than N;
- a configuring unit that configures printing density for each of the printing elements for each scan, by dividing the M-level data into the printing density for each scan, for respective pixels; and
- a second half-tone processing unit that performs a quantization process on the printing density for the scan of interest to calculate second N-level data to be used by the image forming apparatus, based on a predetermined constraining information for the scan of interest, wherein the constraining information indicates how a dot is likely to be formed at respective pixels.

13. The image processing apparatus according to claim 12, wherein a phase of a dot pattern represented by the second N-level data for a scan in an area is opposite to a phase of a dot pattern represented by the second N-level data for preceding scans in the area, at a partial frequency domain including a low-frequency component.

14. A method of controlling an image processing apparatus for generating print data to be supplied to an image forming apparatus having a recording head with a plurality of printing elements, wherein the recording head scans the same location on a print medium repeatedly to form an image, the method comprising:
- an acquisition step that acquires first N-level data, where N is an integer of at least 2, wherein the first N-level data represents half-tone dots to be reproduced;
- a conversion step of converting the first N-level data to M-level data, where M is an integer greater than N;
- a configuring step of configuring printing density for each of the printing elements for each scan, by dividing the M-level data into the printing density for each scan, for respective pixels; and
- a quantization step of performing a quantization process on the printing density for the scan of interest to calculate second N-level data to be used by the image forming apparatus, based on a predetermined constraining information for the scan of interest, wherein the constraining information indicates how a dot is likely to be formed at respective pixels.

* * * * *